US012500356B2

(12) United States Patent
Dong et al.

(10) Patent No.: US 12,500,356 B2
(45) Date of Patent: Dec. 16, 2025

(54) TERMINAL ANTENNA AND MOBILE TERMINAL DEVICE

(71) Applicant: HONOR DEVICE CO., LTD., Shenzhen (CN)

(72) Inventors: Kaiming Dong, Shenzhen (CN); Wei Xiong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 189 days.

(21) Appl. No.: 18/277,285

(22) PCT Filed: May 6, 2022

(86) PCT No.: PCT/CN2022/091301

§ 371 (c)(1),
(2) Date: Aug. 15, 2023

(87) PCT Pub. No.: WO2023/020023

PCT Pub. Date: Feb. 23, 2023

(65) Prior Publication Data

US 2024/0136736 A1 Apr. 25, 2024
US 2024/0235063 A9 Jul. 11, 2024

(30) Foreign Application Priority Data

Aug. 17, 2021 (CN) ........................ 202110945168.X

(51) Int. Cl.
*H01Q 21/28* (2006.01)
*H01Q 1/24* (2006.01)
(Continued)

(52) U.S. Cl.
CPC ............. *H01Q 21/28* (2013.01); *H01Q 1/243* (2013.01); *H01Q 1/521* (2013.01); *H01Q 5/328* (2015.01); *H01Q 5/364* (2015.01)

(58) Field of Classification Search
CPC ........ H01Q 1/243; H01Q 1/521; H01Q 5/328; H01Q 5/364; H01Q 21/28
See application file for complete search history.

(56) References Cited

U.S. PATENT DOCUMENTS 10,763,571 B2 9/2020 Chen et al.
10,819,013 B2 10/2020 Lin
(Continued)

FOREIGN PATENT DOCUMENTS

CN 107394347 A 11/2017
CN 107437661 A 12/2017
(Continued)

*Primary Examiner* — Daniel Munoz
(74) *Attorney, Agent, or Firm* — WOMBLE BOND DICKINSON (US) LLP

(57) ABSTRACT

This application provides a terminal antenna and a mobile terminal device. The terminal antenna includes a frame, a first feed, and a second feed. A part of the frame on a side of the first gap away from the second gap forms the first conductor, a part of the frame on a side of the second gap away from the first gap forms the second conductor, and the frame between the first gap and the second gap forms the third conductor. The first feed is electrically connected to the first conductor, so that the first conductor radiates a signal, and the second feed is electrically connected to the second conductor, so that the second conductor radiates a signal in a low band.

20 Claims, 12 Drawing Sheets

(51) Int. Cl.

| | |
|---|---|
| ***H01Q 1/52*** | (2006.01) |
| ***H01Q 5/328*** | (2015.01) |
| ***H01Q 5/364*** | (2015.01) |

(56) References Cited

U.S. PATENT DOCUMENTS

| | | | | |
|---|---|---|---|---|
| 11,128,047 | B2 | 9/2021 | Xue et al. | |
| 2010/0060528 | A1 | 3/2010 | Chiu et al. | |
| 2018/0026337 | A1 | 1/2018 | Chen et al. | |
| 2019/0027833 | A1* | 1/2019 | Ayala Vazquez | H01Q 5/342 |
| 2019/0044218 | A1* | 2/2019 | Ye | H01Q 5/50 |
| 2020/0373669 | A1 | 11/2020 | Xue et al. | |
| 2021/0111486 | A1 | 4/2021 | Maruti et al. | |
| 2023/0029513 | A1 | 2/2023 | Cai et al. | |
| 2023/0352852 | A1 | 11/2023 | Xiaopu | |

FOREIGN PATENT DOCUMENTS

| | | | |
|---|---|---|---|
| CN | 108511904 | A | 9/2018 |
| CN | 109066105 | A | 12/2018 |
| CN | 109560364 | A | 4/2019 |
| CN | 110459856 | A | 11/2019 |
| CN | 212136686 | U | 12/2020 |
| CN | 110741506 | B | 2/2021 |
| CN | 112751212 | A | 5/2021 |
| CN | 112838351 | A | 5/2021 |
| CN | 113851821 | A | 12/2021 |
| TW | 201916467 | A | 4/2019 |
| TW | I674701 | B | 10/2019 |
| WO | 2019228368 | A1 | 12/2019 |
| WO | 2021143419 | A1 | 7/2021 |

* cited by examiner

TERMINAL ANTENNA AND MOBILE TERMINAL DEVICE

CROSS-REFERENCE TO RELATED APPLICATIONS

This application is a national stage of International Application No. PCT/CN2022/091301, filed on May 6, 2022, which claims priority to Chinese Patent Application No. 202110945168.X, filed on Aug. 17, 2021. The disclosures of both of the aforementioned applications are hereby incorporated by reference in their entireties.

TECHNICAL FIELD

This application relates to the field of antenna technologies, and in particular, to a terminal antenna and a mobile terminal device.

BACKGROUND

A mobile cellular communication technology establishes a wireless connection between a mobile terminal and a base station system. The technology has developed to a 5th generation (5G) mobile communication technology through long-term evolution. A low band of the mobile cellular communication technology is widely applied to each generation of mobile communication technologies due to characteristics of a low loss and a long transmission distance.

However, due to a miniaturization trend of a mobile terminal device, how to deploy a plurality of low frequency antennas on the mobile terminal device with severely limited space becomes a technical problem that needs to be resolved.

SUMMARY

In view of this, this application provides a terminal antenna having a plurality of low frequency antennas and a mobile terminal device.

A first aspect of this application provides a terminal antenna, including a frame, a first feed, and a second feed. A first gap and a second gap that partition the frame are provided on the frame, to form a first conductor, a second conductor, and a third conductor on the frame, at least a part of the frame on a side of the first gap away from the second gap forms the first conductor, at least a part of the frame on a side of the second gap away from the first gap forms the second conductor, and the frame between the first gap and the second gap forms the third conductor. The first feed is electrically connected to the first conductor, so that the first conductor radiates a signal. The second feed is electrically connected to the second conductor, so that the second conductor radiates a signal in a low band. The terminal antenna further includes a control circuit. One end of the control circuit is grounded, and the other end is electrically connected to the first conductor, to control the first conductor to radiate a signal in a medium-high band or radiate a signal in the low band.

In the foregoing design, current signals are fed to a first radiator and a second radiator by using the first feed and the second feed, so that the first radiator and the second radiator respectively radiate signals in the low band. The control circuit is further disposed on the terminal antenna, and is configured to control the first conductor to radiate a signal in the medium-high band or a radiation signal in the low band, to implement multiplexing of the first conductor in the medium-high band and the low band, thereby effectively improving mobile communication performance of the terminal antenna.

In a possible design, the control circuit includes a first passive element, a second passive element, a first switch, and a second switch. One end of the first switch and one end of the second switch are separately grounded, the other end of the first switch is connected to one end of the first passive element, the other end of the second switch is connected to one end of the second passive element, and the other end of the first passive element and the other end of the second passive element are electrically connected to the first conductor. When the first switch corresponding to the first passive element is turned on, the first conductor radiates a signal in the medium-high band; and when the second switch corresponding to the second passive element is turned on, the second conductor radiates a signal in the low band.

In a possible design, the first passive element is a capacitor, and a range of a capacitance value of the first passive element is 0 picofarads to 2 picofarads; and the second passive element is an inductor, and a range of an inductance value of the second passive element is 0 nanohenries to 5 nanohenries.

In the foregoing design, the control circuit is disposed, and when a first control element in the control circuit is conducted, an equivalent electrical length of the first conductor is shortened, so that the first conductor radiates a signal in the medium-high band.

In a possible design, the terminal antenna further includes a tuning circuit. The tuning circuit includes a third passive element and a third switch, one end of the third switch is grounded, the other end of the third switch is electrically connected to one end of the third passive element, the other end of the third passive element is connected to the third conductor, and by controlling the third switch to turn on or turn off, isolation between the first conductor and the second conductor is adjusted when the first conductor and the second conductor operate in the low band.

In a possible design, the third passive element is an inductor, and a range of an inductance value of the third passive element is 1 nanohenry to 68 nanohenries.

In the foregoing design, the tuning circuit is disposed on the third conductor, to improve the isolation when both the first conductor and the second conductor radiate signals in the low band, thereby effectively improving mobile communication performance of the terminal antenna.

In a possible design, the tuning circuit further includes a fourth passive element. One end of the fourth passive element is grounded, and the other end is electrically connected to the third conductor.

In the foregoing design, a tuning bypass element is disposed to maintain a connected state between the tuning circuit and the third conductor.

In a possible design, when the first switch in the control circuit is turned on, the third switch in the tuning circuit is turned off. When the second switch in the control circuit is turned on, the third switch in the tuning circuit is turned on.

In the foregoing design, the first switch and the second switch are controlled to turn off or turn on, to implement that the tuning element is turned off when the first radiator radiates a signal in the medium-high band, and the tuning element is conducted when the first conductor radiates a signal in the low band, thereby adjusting isolation when both the first conductor and the second conductor radiate radiation in the low band.

In a possible design, the terminal antenna further includes a first switching circuit and a second switching circuit. The first switching circuit and the second switching circuit each include several passive elements and several corresponding switches. One end of each of the several switches in the first switching circuit is grounded, the other end is connected to one end of each of the several passive elements in the first switching circuit in a one-to-one correspondence manner, and the other end of each of the several passive elements in the first switching circuit is connected between the first feed and the first conductor. One end of each of the several switches in the second switching circuit is grounded, the other end of each of the several switches in the second switching circuit is connected to one end of each of the several passive elements in the second switching circuit in a one-to-one correspondence manner, and the other end of each of the several passive elements in the second switching circuit is connected between the second feed and the second conductor.

In the foregoing design, the first switching circuit and the second switching circuit are disposed to provide impedance matching for the terminal antenna, to expand bandwidth of the terminal antenna and optimize radiation performance of the terminal antenna.

In a possible design, the first feed is electrically connected to an end of the first conductor close to the first gap.

In a possible design, the frame includes an end portion, a first side portion, and a second side portion, the first side portion and the second side portion are disposed opposite to each other and are respectively disposed at two ends of the end portion, the first gap and the second gap are spaced on the end portion, the first gap is provided close to the first side portion, the second gap is provided close to the second side portion, and the first feed is electrically connected to a junction of the second side portion and the end portion that is on the first conductor.

In the foregoing design, two location solutions for electrically connecting the first feed to the frame are provided. In this way, a person skilled in the art can select different location connection solutions of the first feed based on an actual product.

In a possible design, the control circuit includes several passive elements and several corresponding switches. One end of each of the several switches in the control circuit is grounded, the other end is connected to one end of each of the several passive elements in the control circuit in a one-to-one correspondence manner, the other end of each of the several passive elements in the control circuit is connected between the first conductor and the first feed, and when at least one switch in the control circuit is turned on, the first conductor radiates a signal in the medium-high band; and when all switches in the control circuit are turned off, the first conductor radiates a signal in the low band.

In a possible design, the passive element is an inductor, and a range of equivalent inductance values of the several passive elements is 1 nanohenry to 10 nanohenries.

In the foregoing design, another control circuit is provided, one end of the control circuit is grounded, and the other end is electrically connected between the first feed and the first conductor.

In a possible design, the terminal antenna further includes a tuning circuit, the tuning circuit includes several tuning elements and several switches, one end of each of the several switches in the tuning circuit is grounded, the other end is connected to one end of each of several passive elements in the tuning circuit in a one-to-one correspondence manner, and the other end of each of the several passive elements in the tuning circuit is connected to the third conductor; and by controlling the several switches in the tuning circuit to turn on or turn off, isolation between the first conductor and the second conductor is adjusted when the first conductor and the second conductor operate in the low band.

In a possible design, the several passive elements of the tuning circuit include a first passive element and a second passive element. Both the first passive element and the second passive element are inductors, and a range of an inductance value of the first passive element is 1 nanohenry to 5 nanohenries. A range of an inductance value of the second passive element is 60 nanohenries to 68 nanohenries. In the tuning circuit, when a switch corresponding to the first passive element is turned on, and a switch corresponding to the second passive element is turned off, the tuning circuit is configured to adjust isolation when both the first conductor and the second conductor operate in 900 MHz. In the tuning circuit, when the switch corresponding to the first passive element is turned off, and the switch corresponding to the second passive element is turned on, the tuning circuit is configured to adjust isolation when both the first conductor and the second conductor operate in 700 MHz.

In the foregoing design, another tuning circuit is provided, and the tuning circuit can adjust, based on different selected tuning elements, the isolation when the first conductor and the second conductor radiate corresponding signals in the low band.

In a possible design, the terminal antenna further includes at least one group of circuits of a first switching circuit, a second switching circuit, and a third switching circuit. The first switching circuit, the second switching circuit, and the third switching circuit each include several passive elements and several switches. One end of each of the several switches of the first switching circuit is grounded, the other end is connected to one end of each of the several passive elements in the first switching circuit in a one-to-one correspondence manner, and the other end of each of the several passive elements in the first switching circuit is connected to the first conductor. One end of each of the several switches of the second switching circuit is grounded, the other end is connected to one end of each of the several passive elements in the second switching circuit in a one-to-one correspondence manner, and the other end of each of the several passive elements in the second switching circuit is connected between the second feed and the second conductor. One end of each of the several switches of the third switching circuit is grounded, the other end is connected to one end of each of the several passive elements in the third switching circuit in a one-to-one correspondence manner, and the other end of each of the several passive elements in the third switching circuit is connected to the second conductor.

In the foregoing design, the terminal antenna further includes three switching circuits. In this way, impedance matching can be provided for the terminal antenna, and bandwidth of the terminal antenna is effectively expanded, thereby improving mobile communication performance of the terminal antenna.

A second aspect of this application provides a mobile terminal device, including the foregoing terminal antenna.

BRIEF DESCRIPTION OF DRAWINGS

To describe the technical solutions in the embodiments of this application or the conventional technology more clearly, the following briefly describes the accompanying drawings required for describing the embodiments or the conventional technology. Apparently, the accompanying drawings in the following description show merely some embodiments of this application, and a person of ordinary skill in the art may still derive other drawings from these accompanying drawings without creative efforts.

Figure 1:
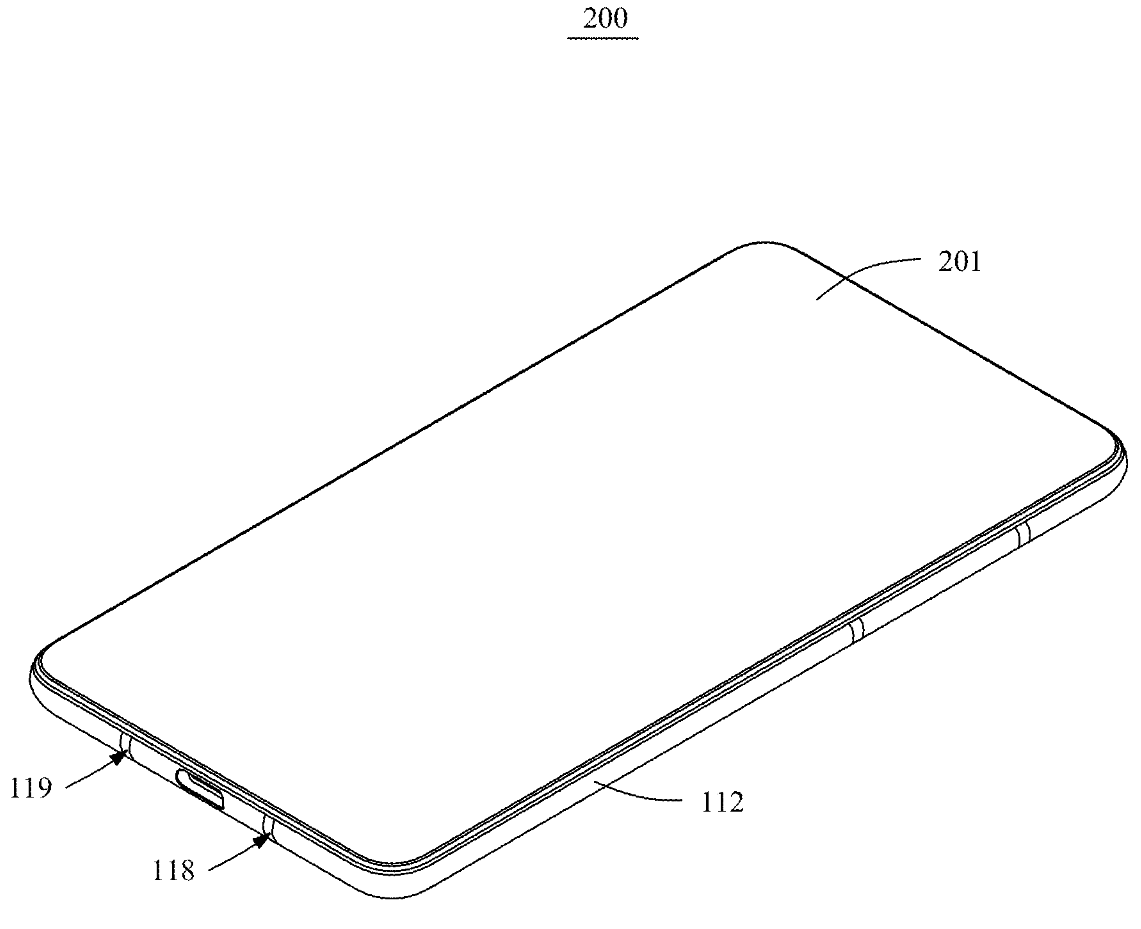
FIG. 1 is a schematic diagram of a terminal antenna applied to a mobile terminal device according to an embodiment of this application.

DESCRIPTION OF REFERENCE SIGNS OF MAIN ELEMENTS mobile terminal device 200; display unit 201; terminal antennas 100 and 100*a;*
housing 11; middle frame 111; frame 112; rear cover 113; accommodating space 114;
end portion 115; first side portion 116; second side portion 117; first gap 118;
second gap 119; opening grooves 120, 125, and 120*a*; third gaps 121 and 121*a;*
isolating portion 122; first radiators 123 and 123*a*; second radiators 124 and 124*a;*
fourth gap 126; third radiator 127; third feed 128; top portion 129;
first feed 13; first switching circuits 14 and 15*a;*
switch units 141, 141*a*, 151, 151*a*, and 181; control element 142*a;*
switching element 152*a*; first switching element 142; second switching element 143;
first bypass elements 144 and 171*a*; third switching element 144*a*; fourth switching element 145*a;*
control circuits 15 and 14*a*; first control element 152; second control element 153;
second feed 16; second switching circuits 17 and 17*a*; third switching element 172;
fourth switching element 173; fourth switching element 174; second bypass elements 175 and 156*a;*
third switching circuit 18*a*; tuning element 182; third bypass element 183;
tuning circuits 18 and 19*a*; grounding portion 19

This application is further described in the following specific implementations with reference to the accompanying drawings.

DESCRIPTION OF EMBODIMENTS

To further explain technical means adopted in this application for achieving an intended application objective and effects, with reference to the accompanying drawings and implementations, apparently, the described embodiments are only some embodiments rather than all the embodiments of this application.

Unless otherwise specified, all technical and scientific terms used in this specification have meanings that are the same as those commonly understood by a person skilled in the art of this application. In this application, terms used in the specification of this application are merely intended to describe objectives of specific embodiments, but are not intended to limit this application.

The technical solutions provided in this application are applicable to a mobile terminal device that uses one or more of the following communication technologies: a Bluetooth (Bluetooth, BT) communication technology, a global positioning system (Global Positioning System, GPS) communication technology, a wireless fidelity (Wireless Fidelity, Wi-Fi) communication technology, a global system for mobile communications (Global System For mobile Communications, GSM) communication technology, a wideband code division multiple access (Wideband Code Division multiple Access, WCDMA) communication technology, a long term evolution (Long Term Evolution, LTE) communication technology, a 5G communication technology, a SUB-6G communication technology, another future communication technology, and the like. In this application, the mobile terminal device may be a device or the like that can receive and send electromagnetic wave signals, such as a mobile phone, a tablet computer, a wearable device, a personal digital assistant (Personal Digital Assistant, PDA), a base station, an in-vehicle radar, or a customer premise equipment (Customer Premise Equipment, CPE).

Some implementations of this application are described below in detail with reference to the accompanying drawings. The following embodiments and features in the embodiments may be mutually combined in a case that no conflict occurs.

Embodiment 1

Figure 2:
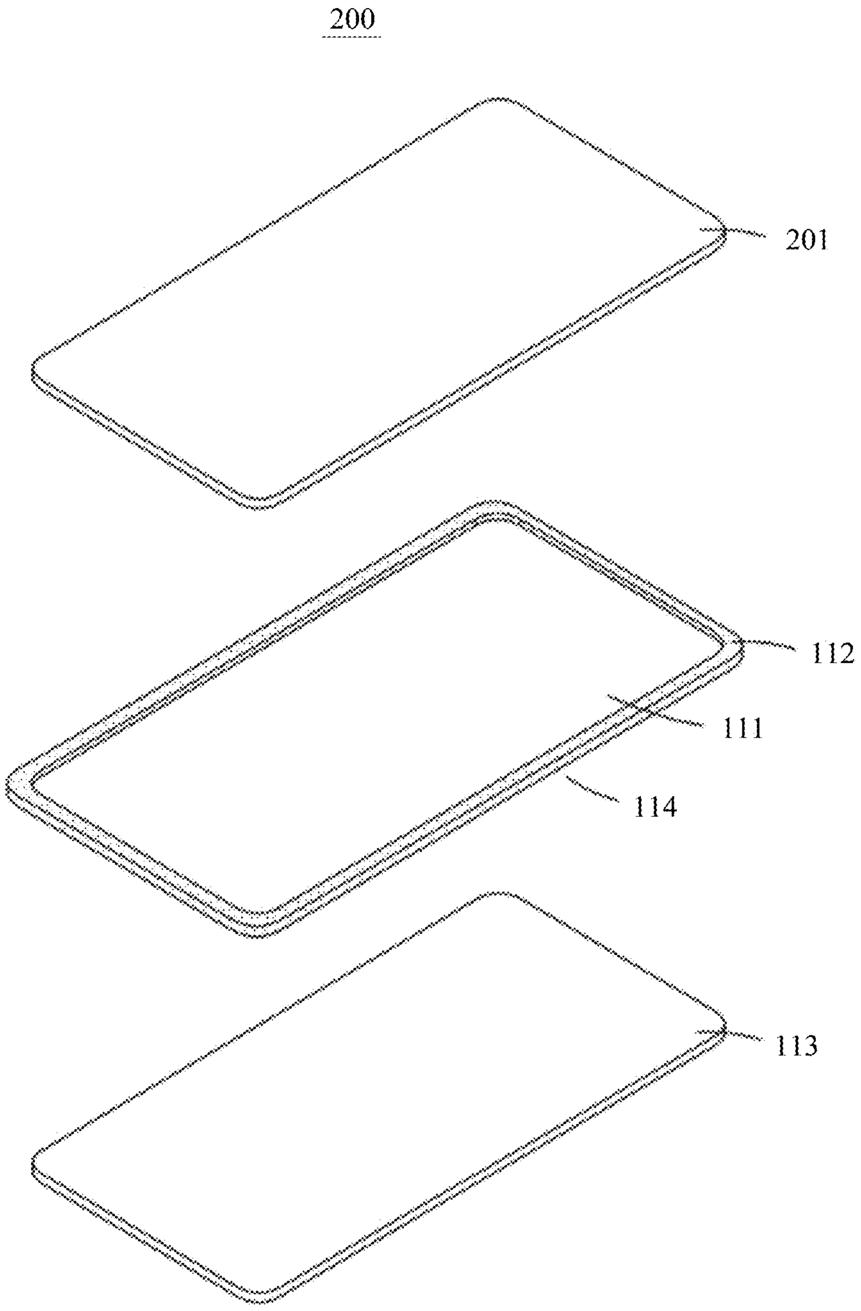
FIG. 2 is a schematic disassembly diagram of the mobile terminal device shown in FIG. 1.
Figure 3:
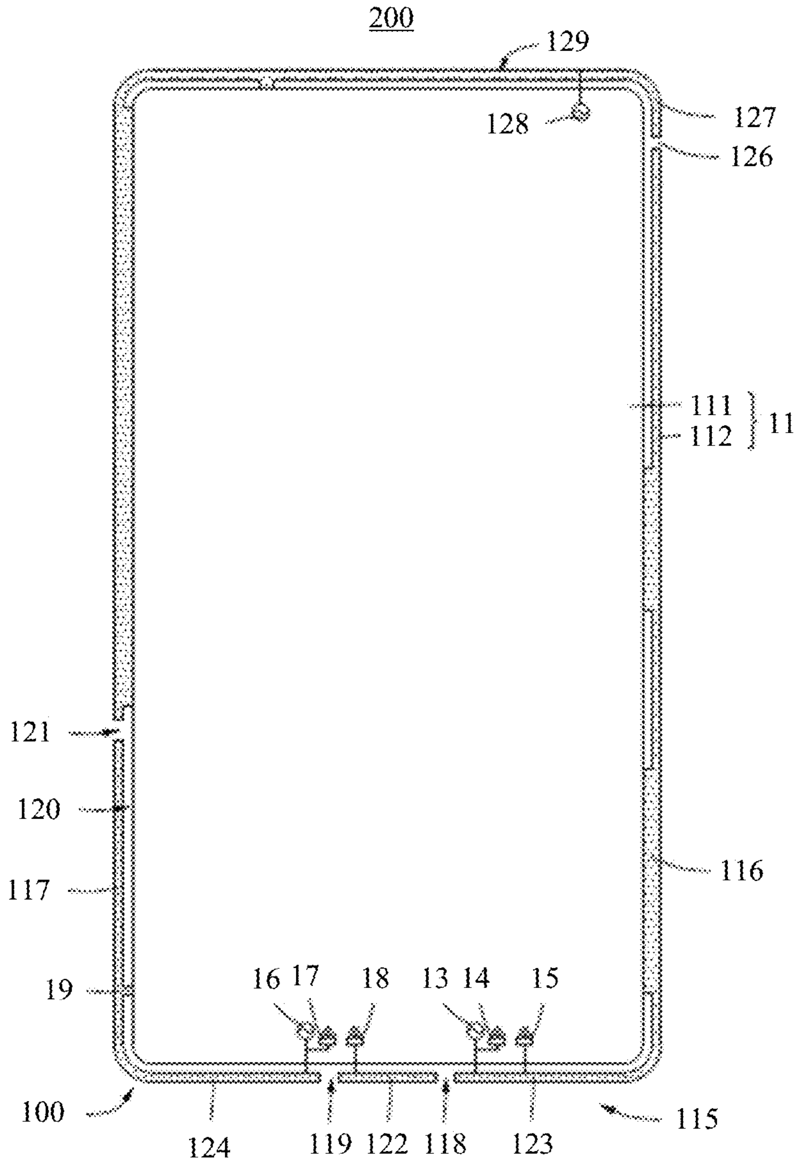
FIG. 3 is a schematic diagram of the terminal antenna in FIG. 1.

Referring to FIG. 1 to FIG. 3, FIG. 1 shows an example of a terminal antenna 100, and the terminal antenna 100 may be applied to a mobile terminal device 200 such as a mobile phone or a personal digital assistant. The terminal antenna 100 includes at least a housing 11, a first feed 13, a first switching circuit 14, a control circuit 15, a second feed 16, a second switching circuit 17, and a tuning circuit 18.

The housing 11 may be a partial housing of the mobile terminal device 200. The housing 11 includes at least a middle frame 111, a frame 112, and a rear cover 113.

In some embodiments, the middle frame 111 is approximately a rectangular sheet body. In some embodiments, the middle frame 111 is made of a metal material and is grounded.

In some embodiments, the frame 112 is made of a metal material and is approximately in an annular structure, and the frame 112 is disposed around an edge of the middle frame 111. In some embodiments, the frame 112 is integrally formed with the middle frame 111. For example, the frame 112 and the middle frame 111 may be an integrated die casting aluminum structure, aluminum profile structure, or the like. In some other embodiments, the frame 112 and the middle frame 111 may alternatively be a combination of two independent mechanisms. In this case, the middle frame 111 may be made of a plastic material or the like. The frame 112 may be a die casting aluminum structural member, an aluminum profile structural member, a flexible printed circuit (FPC) antenna radiator, or a laser-direct-structuring (LDS) antenna radiator.

In some embodiments, an opening (not shown in the figure) is provided on a side of the frame 112 away from the middle frame 111, and is used to accommodate a display unit 201 of the mobile terminal device 200. It may be understood that the display unit 201 has a display plane, the display plane is exposed to the opening, and the display plane and the middle frame 111 are disposed approximately in parallel. The middle frame 111 is located between the display unit 201 and the rear cover 113, and is configured to support the display unit 201, provide electromagnetic shielding, and improve mechanical strength of the mobile terminal device 200.

In some embodiments, the rear cover 113 is also approximately a rectangular sheet body. The rear cover 113 is disposed at an edge of the frame 112, and is disposed approximately in parallel with the display plane of the display unit 201 and the middle frame 111 at intervals. It may be understood that the rear cover 113, the frame 112, and the middle frame 111 together form an accommodating space 114. The accommodating space 114 is used to accommodate electronic elements or circuit modules such as a circuit board, a processing unit, a speaker, and a camera module of the mobile terminal device 200.

The frame 112 includes at least an end portion 115, a first side portion 116, and a second side portion 117. In some embodiments, the end portion 115 is a bottom of the mobile terminal device 200. The first side portion 116 and the second side portion 117 are disposed opposite to each other, and the first side portion 116 and the second side portion 117 are respectively disposed at two ends of the end portion 115, and are disposed approximately perpendicular to the end portion 115. The end portion 115, the first side portion 116, and the second side portion 117 are all perpendicularly connected to the middle frame 111.

In some embodiments, at least an opening groove 120, a first gap 118, and a second gap 119 are provided on the housing 11.

In some embodiments, the opening groove 120 is approximately L-shaped and disposed between the middle frame 111 and the end portion 115 of the frame 112. In addition, the opening groove 120, the first gap 118, and the second gap 119 separately extend by a distance toward a direction in which the first side portion 116 and the second side portion 117 are located, so that the end portion 115, a part of the first side portion 116, and a part of the second side portion 117 are disposed at intervals with the middle frame 111. The opening groove 120 approximately extends to a middle location of the second side portion 117, and the opening groove 120 approximately extends to a side of the first side portion 116 close to the end portion 115.

In some embodiments, both the first gap 118 and the second gap 119 are disposed on the end portion 115 of the frame 112, and partition the frame 112. The first gap 118 and the second gap 119 are spaced apart, the first gap 118 is disposed close to the first side portion 116, and the second gap 119 is disposed close to the second side portion 117. The first gap 118 and the second gap 119 communicate with each other by using the opening groove 120. In this case, the opening groove 120, the first gap 118, and the second gap 119 together divide the frame 112 into at least a first conductor, a second conductor, and a third conductor.

In some embodiments, a third gap 121 is further provided on the frame 112 of the terminal antenna 100. The third gap 121 is provided at an end of the opening groove 120 away from the second gap 119. In this case, the frame 112 between the first gap 118 and the second gap 119 forms the third conductor, namely, an isolating portion 122. The frame 112 on a side of the first gap 118 away from the second gap 119 forms the first conductor, namely, a first radiator 123. The frame 112 between the second gap 119 and the third gap 121 forms the second conductor, namely, a second radiator 124. In this case, the isolating portion 122 is formed on the end portion 115. The first radiator 123 is formed on the end portion 115 and the first side portion 116. The second radiator 124 is formed on the end portion 115 and the second side portion 117. In addition, a length of the isolating portion 122 is less than lengths of the first radiator 123 and the second radiator 124.

In some embodiments, an end of the first radiator 123 away from the first gap 118 is grounded by using the middle frame 111, to provide grounding for the first radiator 123. That is, the opening groove 120 is used to separate the frame 112 (namely, the first radiator 123, the second radiator 124, and the isolating portion 122) from the middle frame 111. In a part other than the opening groove 120, the frame 112 is connected to the middle frame 111.

In some embodiments, the terminal antenna 100 further includes a grounding portion 19. One end of the grounding portion 19 is connected to an approximate middle location of the second radiator 124, namely, an end of the second side portion 117 close to the end portion 115, and the other end of the grounding portion 19 is grounded. In this case, the grounding portion 19 is configured to provide grounding for the second radiator 124.

It may be understood that, in this embodiment, the opening groove 120, the first gap 118, and the second gap 119 are all filled with insulating materials (such as plastic, rubber, glass, wood, and ceramic, which are not limiting).

Figure 4:
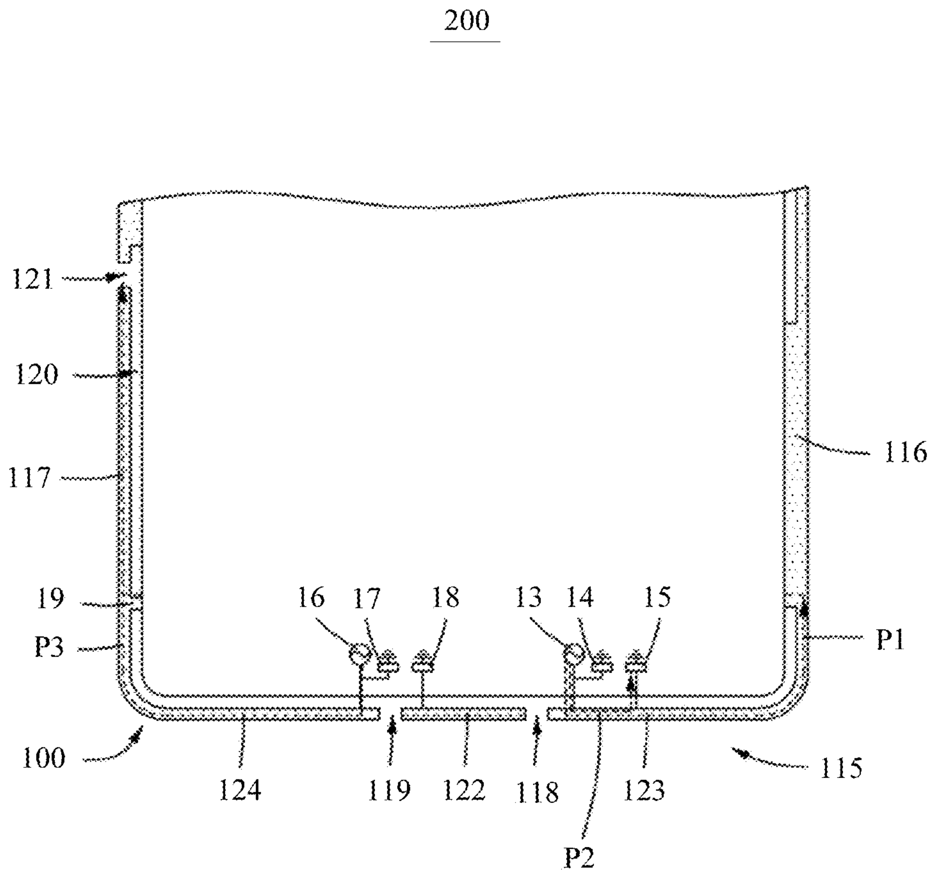
FIG. 4 is a diagram of a partial current path of the terminal antenna shown in FIG. 3.
Figure 5:
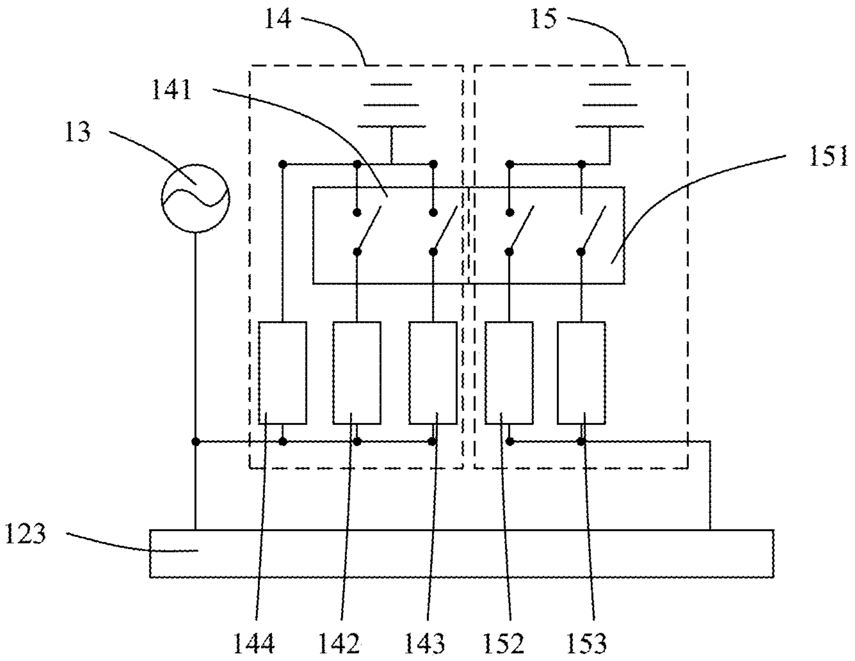
FIG. 5 is a circuit block diagram of a first switching circuit and a control circuit in the terminal antenna shown in FIG. 3.
Figure 6:
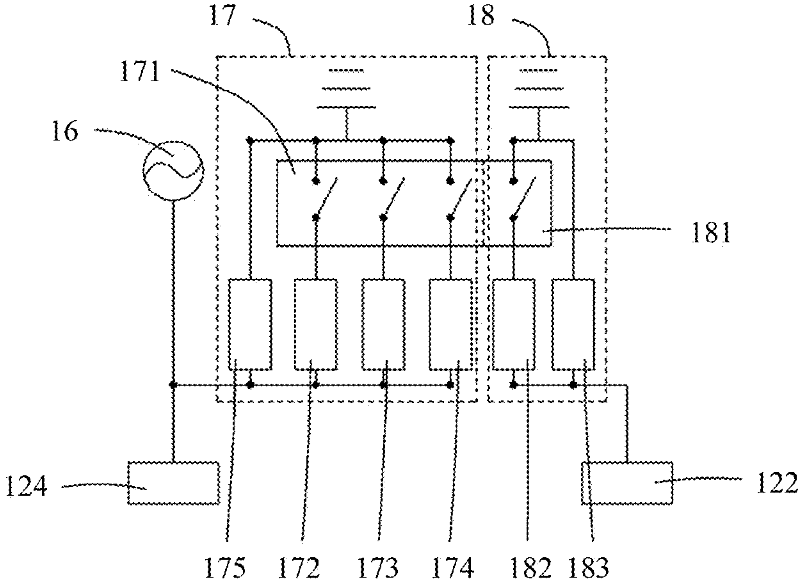
FIG. 6 is a circuit block diagram of a second switching circuit and a tuning circuit in the terminal antenna shown in FIG. 4.
Figure 7:
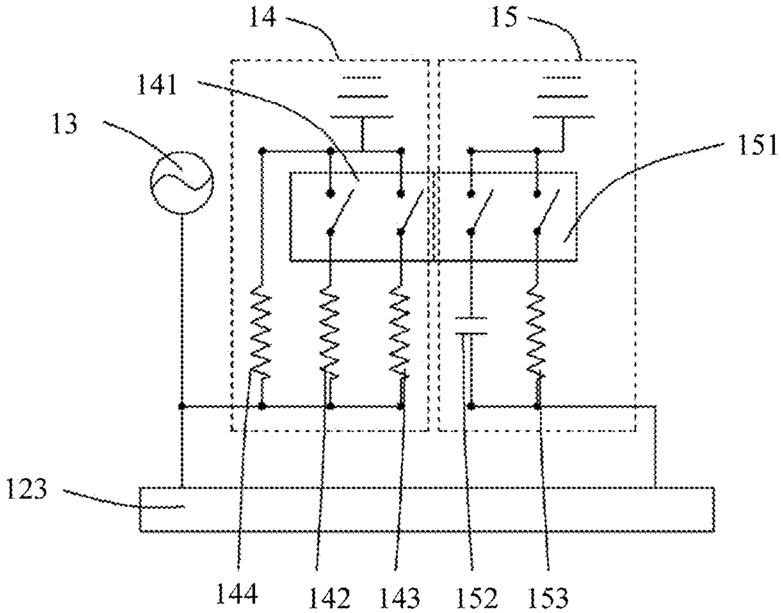
FIG. 7 is a schematic circuit diagram of a first switching circuit and a control circuit according to an embodiment of this application.
Figure 8:
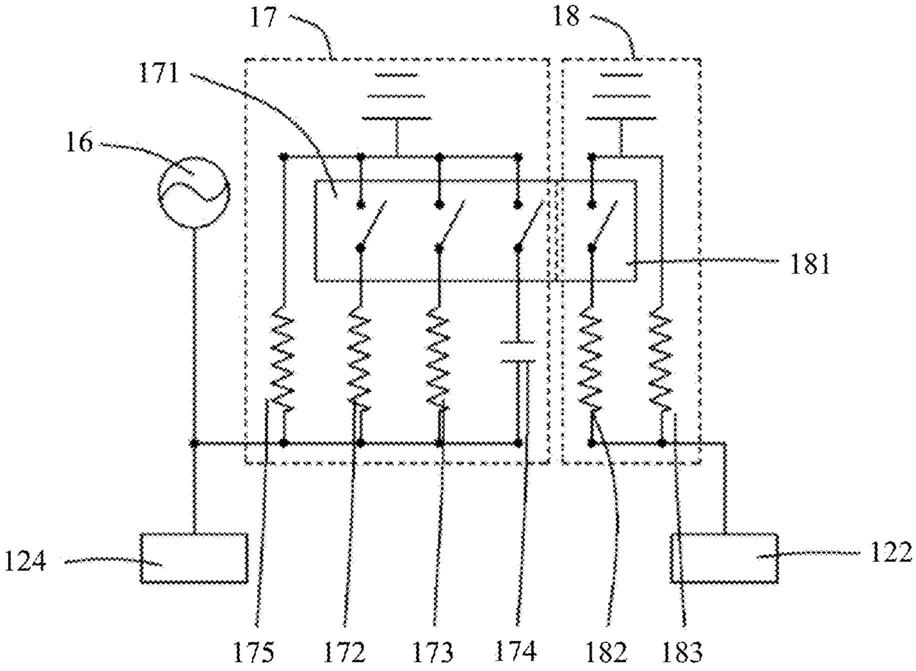
FIG. 8 is a schematic circuit diagram of a second switching circuit and a tuning circuit according to an embodiment of this application.

Referring to FIG. 4 to FIG. 6, in some embodiments, the first feed 13 is disposed in the accommodating space 114. The first feed 13 is electrically connected to the first radiator 123, and is configured to feed a current signal into the first radiator 123. One end of the first switching circuit 14 is grounded, and the other end is electrically connected between the first feed 13 and the first radiator 123, to switch a radiation band. One end of the control circuit 15 is grounded, and the other end is electrically connected to the frame 112 on a side that is of the first radiator 123 and that is away from the first gap 118, to control the first radiator 123 to radiate a signal in a low band or a signal in a medium-high band.

In some embodiments, the low band includes 700 MHz-960 MHz, and the medium-high band includes 1710 MHz-2700 MHz.

In some embodiments, the second feed 16 is disposed in the accommodating space 114. The second feed 16 is electrically connected to the second radiator 124, and is configured to feed a current signal to the second radiator 124. One end of the second switching circuit 17 is grounded, and the other end is electrically connected between the second feed 16 and the second radiator 124, to switch a radiation band.

In some embodiments, one end of the tuning circuit 18 is grounded, and the other end is electrically connected to an end of the isolating portion 122 close to the second gap 119. In one aspect, the tuning circuit 18 is configured to adjust isolation when both the first radiator 123 and the second radiator 124 radiate signals in the low band. In another aspect, currents of the first radiator 123 and the second radiator 124 are respectively coupled to the isolating portion 122 through the first gap 118 and the second gap 119, so that the isolating portion 122 generates resonance. The tuning circuit 18 is configured to adjust a resonance frequency of the isolating portion 122, to expand bandwidth of the terminal antenna 100.

It may be understood that, after a current is fed from the first feed 13, the current flows through the first radiator 123, and is grounded through an end that is of the first radiator 123 and that is connected to the grounding middle frame 111 (refer to a path P1), thereby exciting a first operating modal and a second operating modal, to radiate signals in a first radiation band and a second radiation band. After the current is fed from the first feed 13, the current flows through the first radiator 123, and is conducted and grounded by using the control circuit 15 (refer to a path P2), thereby exciting a third operating modal to radiate a signal in a third radiation band. It may be understood that the current flowing through the first radiator 123 is further coupled to the isolating portion 122 through the first gap 118, so that the isolating portion 122 radiates a radiation signal in a resonance band.

It may be understood that, after a current is fed from the second feed 16, the current flows through the second radiator 124, and is grounded through the grounding portion 19 (refer to a path P3), thereby exciting a fourth operating modal to radiate a signal in a fourth radiation band. It may be understood that the current flowing through the second radiator 124 further continues to flow to the second side portion 117, to radiate a signal in a resonance band of the second radiator 124, to improve radiation performance of the second radiator 124. It may be understood that, after the current is fed from the second feed 16, the current is further coupled to the isolating portion 122 through the second gap 119, so that the isolating portion 122 generates parasitic resonance, effectively expanding bandwidth of the terminal antenna 100.

In some embodiments, the first operating modal is a long term evolution advanced (Long Term Evolution Advanced, LTE-A) Band20 operating modal. In some embodiments, the first operating band includes 791-821 MHz. In this case, further, the first operating modal is a downlink operating modal of long term evolution advanced (Long Term Evolution Advanced, LTE-A) Band20.

In some embodiments, the second operating modal is a downlink operating modal of 5th generation mobile communication technology (5th Generation Mobile Communication Technology, 5G) new radio (New Radio, NR) N28. In some embodiments, the second operating band includes 758-803 MHz. In this case, further, the second operating modal is the downlink operating modal of 5th generation mobile communication technology (5th Generation Mobile Communication Technology, 5G) new radio (New Radio, NR) N28.

In some embodiments, the third operating modal is a long term evolution advanced (Long Term Evolution Advanced, LTE-A) medium-high band modal, and the third operating band includes 1710-2700 MHz.

In some embodiments, the fourth operating modal is an uplink and downlink operating modal of 5th generation mobile communication technology (5th Generation Mobile Communication Technology, 5G) new radio (New Radio, NR) N28, and the fourth operating band includes 703-803 MHz (namely, UL: 703-748 MHz and DL: 758-803 MHz).

It may be understood that, the terminal antenna 100 extends the opening groove 120 from the end portion 115 to the first side portion 116, to extend the length of the first radiator 123. In addition, the control circuit 15 is disposed on the first radiator 123, to multiplex the first radiator 123, so that the first radiator 123 can excite the first operating modal, the second operating modal, and the third operating modal.

In some embodiments, a length range of the first radiator 123 includes 24 mm (millimeters)-35 mm (millimeters).

It may be understood that, in another embodiment, the length of the first radiator 123 is not limited to the foregoing range. For example, when the length of the first radiator 123 is less than 24 mm, the first radiator 123 may receive the current fed by the first feed 13, to radiate a signal in the medium-high band. In this case, the first radiator 123 may extend an equivalent current path on a first radiator **123*a* through grounding of the control circuit 15**, to radiate a signal in a low radiation band.

Further, in this application, the second radiator 124 is disposed on the frame, and the second radiator 124 is also a low frequency antenna. In this case, at least two low frequency antennas independently operating (for example, the first radiator 123 and the second radiator 124) are formed on the terminal antenna 100, and may simultaneously operate in a 4G low band and a 5G low band. This greatly enriches use scenarios of the terminal antenna 100 and improves mobile communication performance of the mobile terminal device 200.

Still referring to FIG. 5 and FIG. 6, in some embodiments, the first switching circuit 14 includes a switch unit 141 and at least one switching element. The switch unit 141 includes several switches, and one end of each switch is grounded. The other end of each switch is connected to one end of each switching element in a one-to-one correspondence manner. All switching elements are connected in parallel, and the other end of each switching element is electrically connected between the first feed 13 and the first radiator 123. In some embodiments, the at least one switching element includes a first switching element 142 and a second switching element 143.

In some embodiments, the first switching circuit 14 further includes a first bypass element 144. One end of the first bypass element 144 is grounded, and the other end is electrically connected between the first feed 13 and the first radiator 123, to maintain a connected state between the first switching circuit 14 and each of the first radiator 123 and the first feed 13 when all switches in the switch unit 141 are turned off.

In some embodiments, the control circuit 15 includes a switch unit 151 and at least one control element. The switch unit 151 includes several switches, and one end of each switch is grounded. The other end of each switch is connected to one end of each control element in a one-to-one correspondence manner. All control elements are connected in parallel, and the other end of each control element is electrically connected to the first radiator 123. In some embodiments, the at least one control element includes a first control element 152 and a second control element 153.

In some embodiments, the second switching circuit 17 includes a switch unit 171 and at least one switching element. The switch unit 171 includes several switches, and one end of each switch is grounded. The other end of each switch is connected to one end of each switching element in a one-to-one correspondence manner. All switching elements are connected in parallel, and the other end of each switching element is electrically connected between the second feed 16 and the second radiator 124. In some embodiments, the at least one switching element includes a third switching element 172, a fourth switching element 173, and a fifth switching element 174.

In some embodiments, the second switching circuit 17 further includes a second bypass element 175. One end of the second bypass element 175 is grounded, and the other end is electrically connected between the second feed 16 and the second radiator 124, to maintain a connected state between the second switching circuit 17 and each of the second radiator 124 and the second feed 16 when all switches in the third switch unit 171 are turned off.

In some embodiments, the tuning circuit 18 includes a switch unit 181 and at least one tuning element. The switch unit 181 includes several switches, and one end of each switch is grounded. The other end of each switch is connected to one end of each tuning element in a one-to-one correspondence manner. All tuning elements are connected in parallel, and the other end of each tuning element is electrically connected to the isolating portion 122. In some embodiments, the at least one tuning element includes a tuning element 182.

In some embodiments, the tuning circuit 18 further includes a third bypass element 183. One end of the third bypass element 183 is grounded, and the other end is electrically connected to the isolating portion 122, to maintain a connected state between the tuning circuit 18 and the isolating portion 122 when all switches in the fourth switch unit 181 are turned off.

It may be understood that each control element, each switching element, and each bypass element may be at least one passive element or a combination of several passive elements. It may be understood that the passive element is, for example, an inductor, a capacitor, or a resistor.

It may be understood that the switch in each switch unit is controlled to turn off or turn on, so that the first radiator 123 or the second radiator 124 is switched to a different switching element or control element. Because each switching element or each control element has a corresponding impedance, by turning off or turning on the switch in each switch unit, a radiation frequency of the first radiator 123 or the second radiator 124 can be effectively adjusted, and/or a resonance frequency of the isolating portion 122 can be adjusted.

In some embodiments, the terminal antenna 100 further includes a control unit (not shown in the figure), and the control unit is configured to control the switch in each switch unit to turn off and turn on, so that the first radiator 123 and the second radiator 124 excite corresponding operating modals and radiate signals in corresponding radiation bands.

It may be understood that the control unit may separately control each switch in the foregoing switch unit to turn on or turn off.

When a switch that is in the control circuit 15 and that corresponds to the first control element 152 is turned on, and other switches of the control circuit 15 and the first switching circuit 14 are turned off, the first radiator 123 excites the third operating modal.

In some embodiments, the first control element 152 is a capacitor, and a range of a capacitance value of the first control element 152 is 0-2 pF (picofarads). For example, in an embodiment, the capacitance value of the first control element 152 is 1 pF.

When a switch that is in the control circuit 15 and that corresponds to the second control element 153 is turned on, and another switch in the control circuit 15 is turned off, an equivalent radiation stub of the first radiator 123 is shortened, so that the first radiator 123 excites the first operating modal and the second operating modal.

In some embodiments, the second control element 153 is a zero-ohm resistor or inductor. When the second control element 153 is an inductor, a range of an inductance value of the second control element 153 is 0-5 nH (nanohenries).

Further, a switch that is in the first switching circuit 14 and that corresponds to the first switching element 142 and/or the second switching element 143 is turned on, to perform impedance tuning on the first radiator 123 and implement band switching of the medium-high band.

In some embodiments, both the first switching element 142 and the second switching element 143 may be inductive elements, and a range of inductance values of equivalent inductors of both the first switching element 142 and the second switching element 143 is 1-10 nH.

When a switch that is in the second switching circuit 17 and that corresponds to the fifth switching element 174 is turned on, a resonance frequency of the second radiator 124 may be adjusted, to assist in improving radiation performance of the first radiator 123 in the medium-high band.

In some embodiments, the fifth switching element 174 is a capacitor. In addition, a range of a capacitance value of the fifth switching element 174 is 0.5-4.7 pF.

It may be understood that the first bypass element 144 may be configured to adjust a resonance frequency of the first radiator 123, to improve radiation performance of the first radiator 123. In some embodiments, the first bypass element 144 is an inductor. In addition, a range of an inductance value of the first bypass element 144 is 30-68 nH.

When a switch that is in the second switching circuit 17 and that corresponds to the third switching element 172 and/or the fourth switching element 173 is turned on, and other switches in the second switching circuit 17 and the tuning circuit 18 are turned off, the second radiator 124 excites the fourth operating modal, and may perform band switching based on an impedance value of a gated switching element.

In some embodiments, when both the third switching element 172 and the fourth switching element 173 are inductors, and a range of equivalent inductance values of both the third switching element 172 and the fourth switching element 173 is 10-82 nH, low band switching may be performed by gating the third switching element 172 and/or the fourth switching element 173 in the second switching circuit 17. For example, when the equivalent inductance values of both the third switching element 172 and the fourth switching element 173 are 82 nH, the second radiator 124 may switch to an operating band of 700 MHz. When the equivalent inductance values of both the third switching element 172 and the fourth switching element 173 are 10 nH, the second radiator 124 may switch to an operating band of 900 MHz.

In addition, the second bypass element 175 in the second switching circuit 17 is an inductor In an embodiment, an inductance value of the second bypass element 175 is 68 nH.

In addition, the third bypass element 183 in the tuning circuit 18 is an inductor, and a range of an inductance value of the third bypass element 183 is 15-20 nH. In this case, the isolating portion 122 is grounded by using the third bypass element 183, and is configured to radiate a signal of the second radiator 124 in a low-frequency resonance band, thereby improving radiation performance of the second radiator 124.

When the first radiator 123 excites the first operating modal and the second operating modal, and the second radiator 124 excites the fourth operating modal, isolation between the first radiator 123 and the second radiator 124 is adjusted by controlling a switch that is in the tuning circuit 18 and that corresponds to the tuning element 182 to turn on or turn off.

That is, when the switch that is in the control circuit 15 and that corresponds to the first control element 152 is turned on, the first radiator 123 excites the third operating modal (that is, radiates a signal in the medium-high band), and the switch that is in the tuning circuit 18 and that corresponds to the tuning element 182 is turned off. When the switch that is in the control circuit 15 and that corresponds to the second control element 153 is turned on, the first radiator 123 excites the first operating modal and the second operating modal (that is, radiates a signal in the low band), and the switch that is in the tuning circuit 18 and that corresponds to the tuning element 182 is turned off, to adjust the isolation between the first radiator 123 and the second radiator 124.

In some embodiments, the tuning element 182 is an inductor. In addition, a range of an inductance value of the tuning element 182 is 1-68 nH. For example, in an embodiment, the tuning element 182 may be an inductor with an inductance value of 5.1 nH.

It may be understood that the inductance value or the capacitance value of each of the switching elements, the control elements, and the bypass elements is an equivalent inductance value or an equivalent capacitance value. That is, each switching element, each control element, and each bypass element mentioned above may include several inductors or capacitors connected in series and in parallel, and are not limited to the foregoing form of a single element.

It may be understood that an equivalent electrical length of the first radiator 123 is shortened by gating the second control element 153 in the control circuit 15, so that the first radiator 123 excites the third operating modal. In addition, the first switching element 142 and/or the second switching element 143 in the first switching circuit 14 are/is gated, to implement switching of the medium-high band. Further, the fifth switching element 174 of the second switching circuit 17 may also be gated, to adjust the resonance frequency of the second radiator 124 and assist in improving radiation performance of the medium-high band.

In this case, the first radiator 123 may be adjusted by using the first switching circuit 14, the control circuit 15, the second switching circuit 17, and the like, to excite the first operating modal and the second operating modal, or excite the third operating modal, so that the first radiator 123 is multiplexed in the low band and the medium-high band.

In some embodiments, the third switching element 172 and/or the fourth switching element 173 in the second switching circuit 17 are/is further gated, so that the second radiator 124 excites the fourth operating modal and switches to a different low band. Further, the second radiator 124 is grounded by using the third bypass element 183 in the tuning circuit 18, so that the isolating portion 122 radiates a signal in a low-frequency resonance band, improving radiation efficiency of the second radiator 124.

It may be understood that, when the first radiator 123 excites the first operating modal and the second operating modal, and the second radiator 124 excites the fourth operating modal, the terminal antenna 100 has at least two low frequency antennas. In this case, by gating the tuning element 182 of the tuning circuit 18, the isolating portion 122 reduces mutual coupling of currents between the first radiator 123 and the second radiator 124, thereby improving isolation between the first radiator 123 and the second radiator 124.

Figure 9:
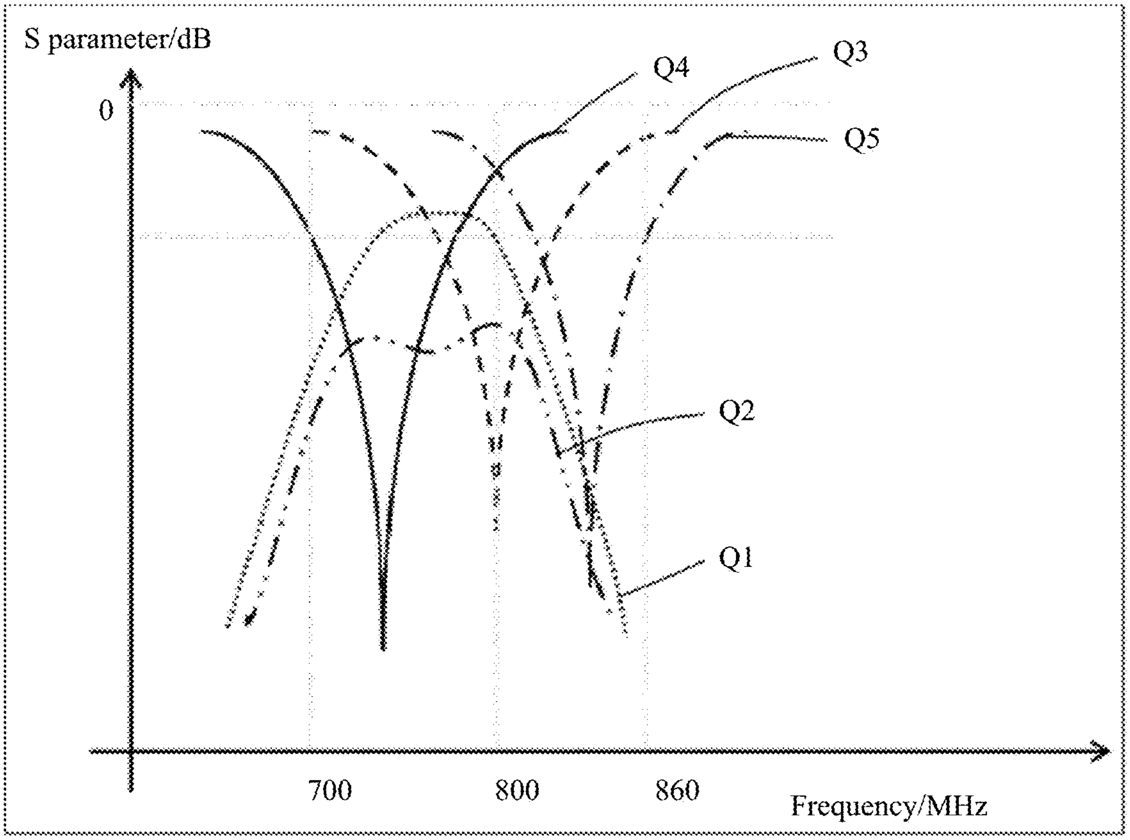
FIG. 9 is a curve diagram of an S parameter (scattering parameter) of the terminal antenna shown in FIG. 1.
Figure 10A:
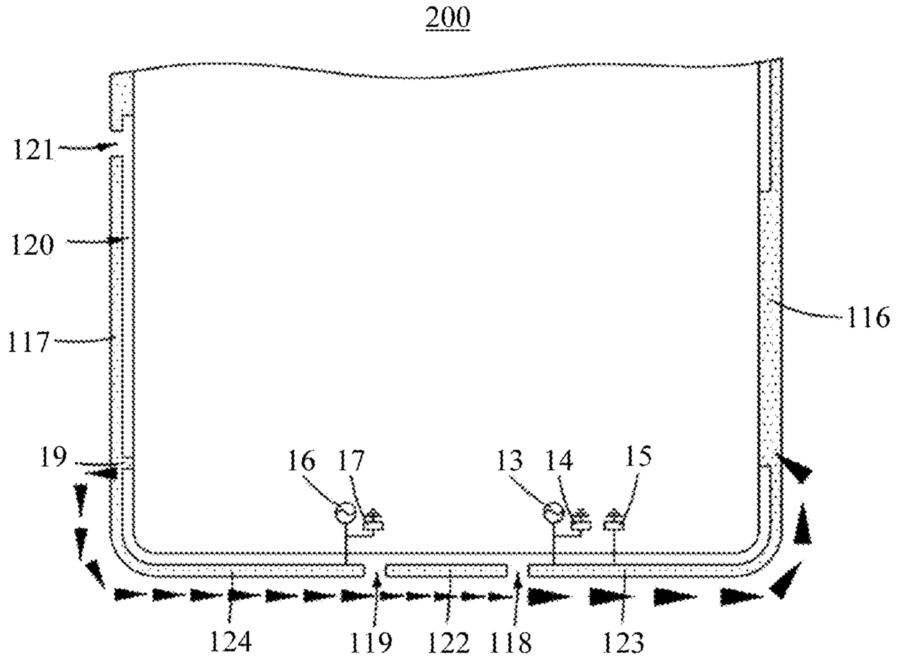
FIG. 10A is a schematic diagram of a current coupled from a second radiator to a first radiator when no tuning circuit is disposed.
Figure 10B:
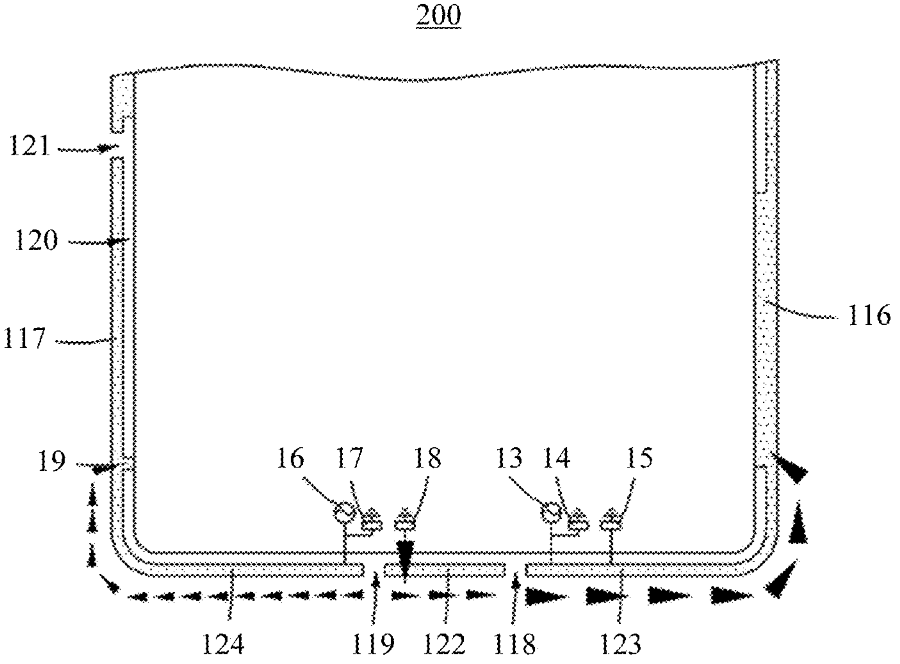
FIG. 10B is a schematic diagram of a current coupled from a second radiator to a first radiator when a tuning circuit is disposed.
Figure 11A:
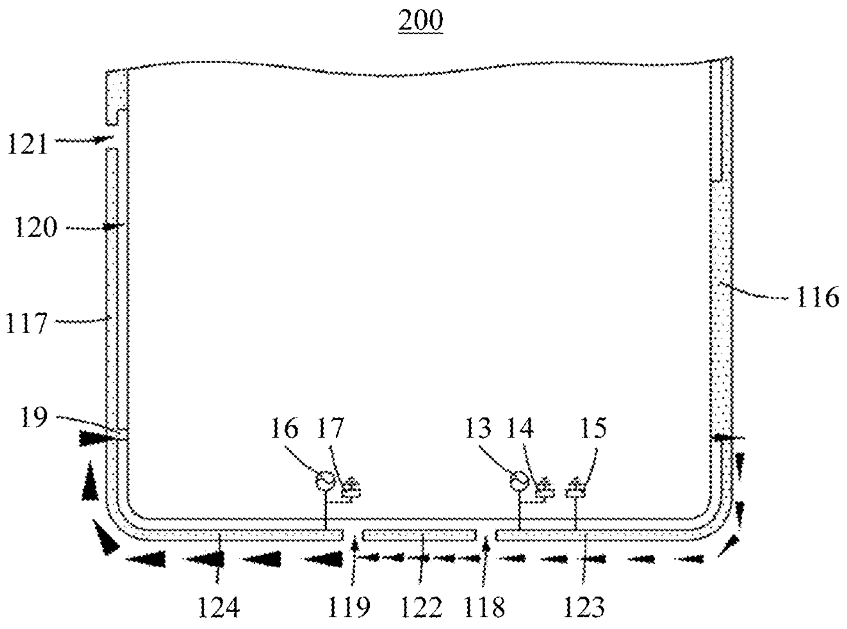
FIG. 11A is a schematic diagram of a current coupled from a first radiator to a second radiator when no tuning circuit is disposed.
Figure 11B:
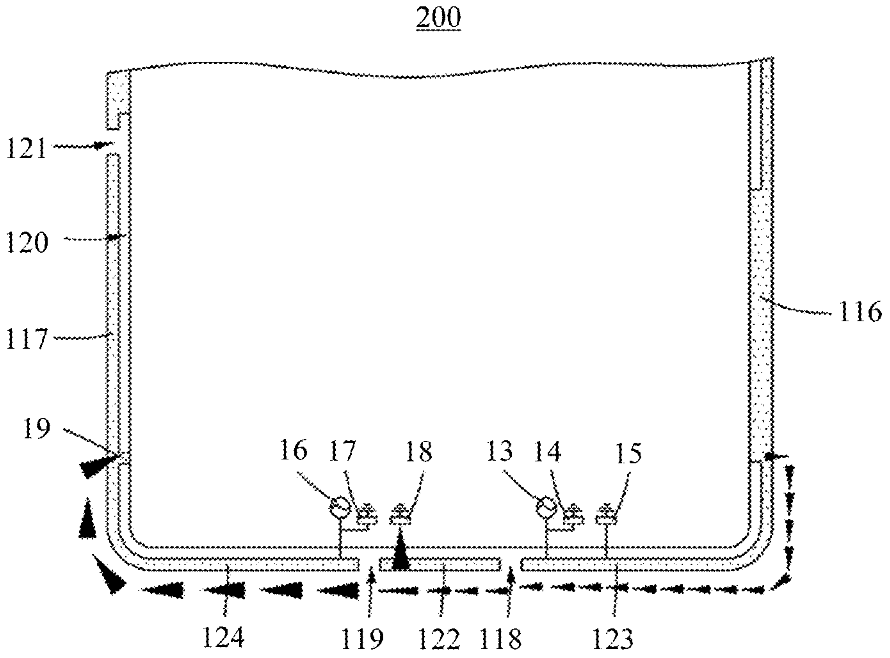
FIG. 11B is a schematic diagram of a current coupled from a first radiator to a second radiator when a tuning circuit is disposed.

Refer to FIG. 9 to FIG. 11B. FIG. 9 is a schematic diagram of an S parameter curve of a terminal antenna 100. A curve Q1 in FIG. 9 indicates isolation between the first radiator 123 and the second radiator 124 when both the first radiator 123 and the second radiator 124 radiate signals in the low band and the switch corresponding to the tuning element 182 is turned off. A curve Q2 in FIG. 9 indicates isolation between the first radiator 123 and the second radiator 124 when both the first radiator 123 and the second radiator 124 radiate signals in the low band and the switch corresponding to the tuning element 182 is turned on. FIG. 10A is a schematic diagram of a current coupled from a second radiator 124 to a first radiator 123 when the first radiator 123 excites a first operating modal and a second operating modal and no tuning circuit is disposed on an isolating portion 122. FIG. 10B is a schematic diagram of a current coupled from a second radiator 124 to a first radiator 123 when the first radiator 123 excites a first operating modal and a second operating modal and a tuning element 182 in a tuning circuit 18 on an isolating portion 122 is turned on. FIG. 11A is a schematic diagram of a current coupled from a first radiator 123 to a second radiator 124 when the first radiator 123 excites a first operating modal and a second operating modal and no tuning circuit 18 is disposed on an isolating portion 122. FIG. 11B is a schematic diagram of a current coupled from a first radiator 123 to a second radiator 124 when the first radiator 123 excites a first operating modal and a second operating modal and a tuning element 182 in a tuning circuit 18 on an isolating portion 122 is turned on.

Apparently, a resonance band of the isolating portion 122 is adjusted by using the tuning circuit 18, to effectively reduce a coupling current between the first radiator 123 and the second radiator 124, thereby effectively improving the isolation between the first radiator 123 and the second radiator 124, so that the first radiator 123 and the second radiator 124 can simultaneously operate in the low band.

It may be understood that when the first radiator 123 excites the third operating modal and the second radiator excites the fourth operating modal, the terminal antenna 100*a* has at least one medium-high frequency antenna and one low frequency antenna. In this case, the fifth switching element 174 is gated, so that the second radiator 124 radiates a signal in the medium-high-frequency resonance band, thereby improving radiation efficiency when the first radiator 123 excites the medium-high band. The isolating portion 122 is grounded by using the third bypass element 183, and radiates a signal of the second radiator 124 in the low-frequency resonance band, to improve radiation efficiency of the second radiator 124.

It may be understood that, according to the terminal antenna 100 provided in Embodiment 1 of this application, the control circuit 15 is disposed, so that the first radiator 123 only needs one feed (for example, the first feed 13) to multiplex the low band and the medium-high band. In this way, the terminal antenna 100 can support a dual connectivity mode of a 4G LTE band and a 5G NR band (E-UTRA-NR Dual Connectivity, EN-DC) in a 5G non-standalone (Non-StandAlone, NSA) networking standard, and implement ultra-wideband carrier aggregation (Carrier Aggregation, CA).

Refer to FIG. 3 again. In some embodiments, the frame 112 further includes a top portion 129. An opening groove 125 and a fourth gap 126 are further provided on the housing 11. The opening groove 125 is disposed between the top portion 129 and the middle frame 111. The fourth gap 126 is located at an end of the first side portion 116 close to the top portion 129, and communicates with the opening groove 125. In this case, the opening groove 125 and the fourth gap 126 together form a third radiator 127 on the frame 112.

In some embodiments, the terminal antenna 100 further includes a third feed 128. In this case, the third feed 128 is electrically connected to the third radiator 127, and is configured to feed a current, to excite a fifth operating modal and radiate a signal in a fifth operating band.

In some embodiments, the fifth operating modal is an uplink and downlink operating modal of long term evolution advanced (Long Term Evolution Advanced, LTE-A) Band20, and the fifth operating band includes 791 MHz-862 MHz. In this case, the terminal antenna 100 has at least three low frequency antennas. It may be understood that a three-low frequency antenna system formed by the terminal antenna 100 may meet an antenna specification of one antenna for transmission and two antennas for reception in respective 4G and 5G bands.

Refer to FIG. 9 again. Curves Q3, Q4, and Q5 respectively indicate S parameter curve diagrams when the first radiator 123, the second radiator 124, and the third radiator 127 operate in the low band. It may be learned from FIG. 9 that the first radiator 123, the second radiator 124, and the third radiator 127 of the terminal antenna 100 have relatively wide radiation bandwidth when operating in the low band. The curve Q3 approximately indicates that the first radiator 123 may operate in 758 MHz-821 MHz. The curve Q4 approximately indicates that the second radiator 124 may operate in 703 MHz-803 MHz. The curve Q5 approximately indicates that the third radiator 127 may operate in 791-862 MHz.

Figure 12:
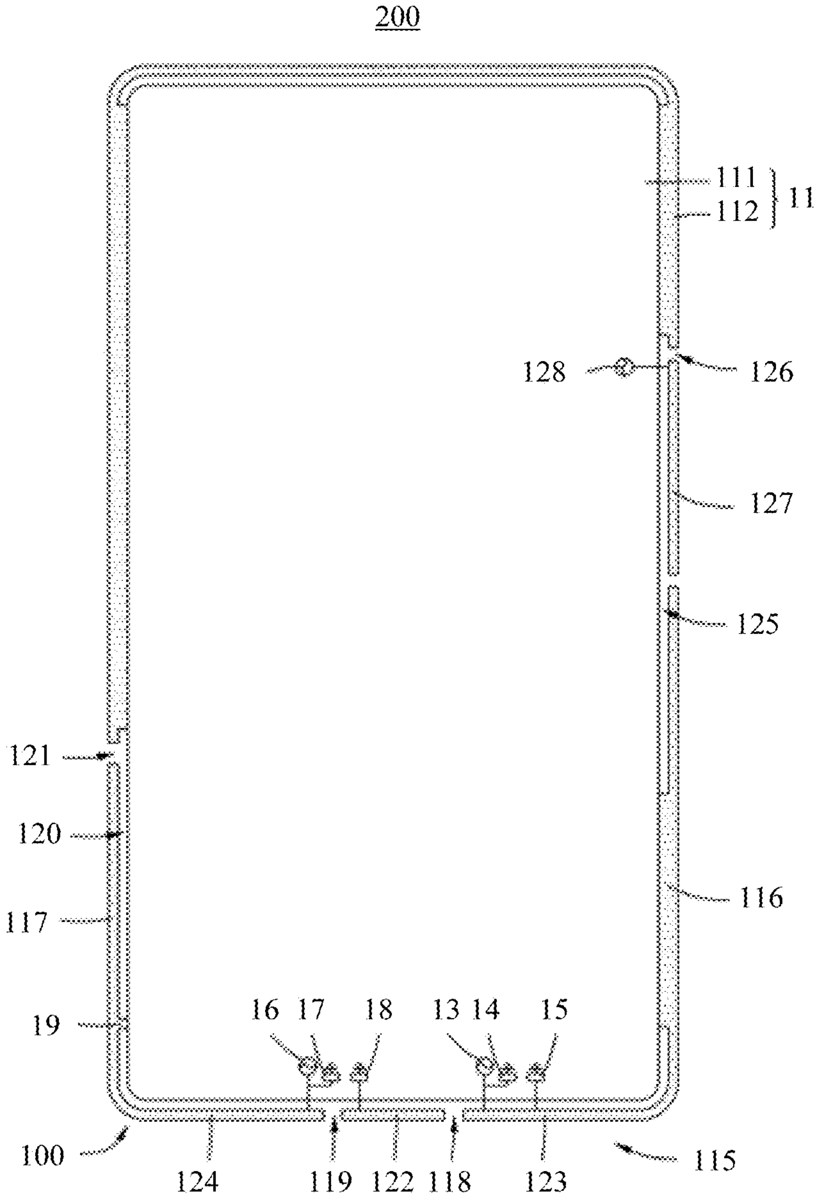
FIG. 12 is a schematic diagram of a terminal antenna according to another embodiment of this application.

Still referring to FIG. 12, in some embodiments, the opening groove 125 is provided between the first side portion 116 and the middle frame 111, and is provided at an approximate middle location of the first side portion 116. The fourth gap 126 is provided at an end that is of the opening groove 125 on the first side portion 116 and that is away from the end portion 115. The opening groove 125 communicates with the fourth gap 126. In this case, the opening groove 125 and the fourth gap 126 together perform division on the frame 112 to form the third radiator 127. The third feed 128 is electrically connected to the third radiator 127, to feed a current to the third radiator 127, so that the third radiator 127 excites the fifth operating modal and radiates a signal in the fifth radiation band.

It may be understood that, in another embodiment, the third radiator 127 may also be configured to multiplex the low band and the medium-high band. This application is not limited to that the third radiator 127 is configured to radiate only a signal in the low band.

It may be understood that, in another embodiment, another radiator may also be formed at another location on the frame 112, and the radiator may radiate a signal in the low-frequency radiation band and/or the medium-high-frequency radiation band. A quantity of radiators on the terminal antenna 100 and an excited operating band are not limited in the present invention.

It may be understood that, in some embodiments, because a location of the first switching circuit 14 is close to that of the control circuit 15, and a location of the second switching circuit 17 is close to that of the tuning circuit 18, the switch unit 141 in the first switching circuit 14 and the switch unit 151 in the control circuit 15 may be together replaced with a four-way single-pole single-throw switch component. The switch unit 171 of the second switching circuit 17 and the switch unit 181 of the tuning circuit 18 may be together replaced with a four-way single-pole single-throw switch component. In this case, use of electronic components of the terminal antenna 100 is reduced, and costs are reduced.

It may be understood that, in another embodiment, the isolating portion 122, the first radiator 123, and the second radiator 124 may alternatively be formed on the top portion 129, the first side portion 116, and/or the second side portion 117 of the mobile terminal device 200. In addition, the first feed 13 and the first switching circuit 14 and the control circuit 15 that correspond to the first feed 13 may be electrically connected to other locations of the first radiator 123, which are not limited to the foregoing recorded locations. The second feed 16 and the second switching circuit 17 and the tuning circuit 18 that correspond to the second feed 16 may be connected to other locations of the second radiator 124, which are not limited to the foregoing recorded locations. In another embodiment, because the feed is connected to the frame 112 at a different location, an equivalent electrical length of a formed radiator is also different. Therefore, a proper control element and tuning element need to be selected for the control circuit 15 and the tuning circuit 18 based on the different equivalent electrical length. Specific parameters of the control element and the tuning element in the control circuit 15 and the tuning circuit 18 are not limited in this application. A person skilled in the art may select, based on the idea of this application and with reference to a specific structure, a control element and a tuning element that have proper parameters.

It may be understood that the grounding portion 19 may be made of a conductive material. For example, the grounding portion 19 may be an electrical connection component such as a spring contact, a screw, a spring sheet, a conductive fabric, a conductive foam, or a conductive adhesive. The grounding portion 19 may be connected to the frame 112 in a manner such as an integral molding technology, riveting, screw locking, and spring sheet spring connecting.

It may be understood that the first feed 13, the first switching circuit 14, the control circuit 15, the second feed 16, the second switching circuit 17, the tuning circuit 18, and the like may also be connected to the frame 112 in a manner such as riveting, screw locking, and spring sheet spring connecting.

It may be understood that the switch mentioned in this application includes but is not limited to a single-pole single-throw switch, a transistor switch, or another switch circuit that can implement a function of turning on or turning off. A person skilled in the art may select a corresponding switch component or switch circuit based on an actual requirement of a product.

Embodiment 2

Figure 13:
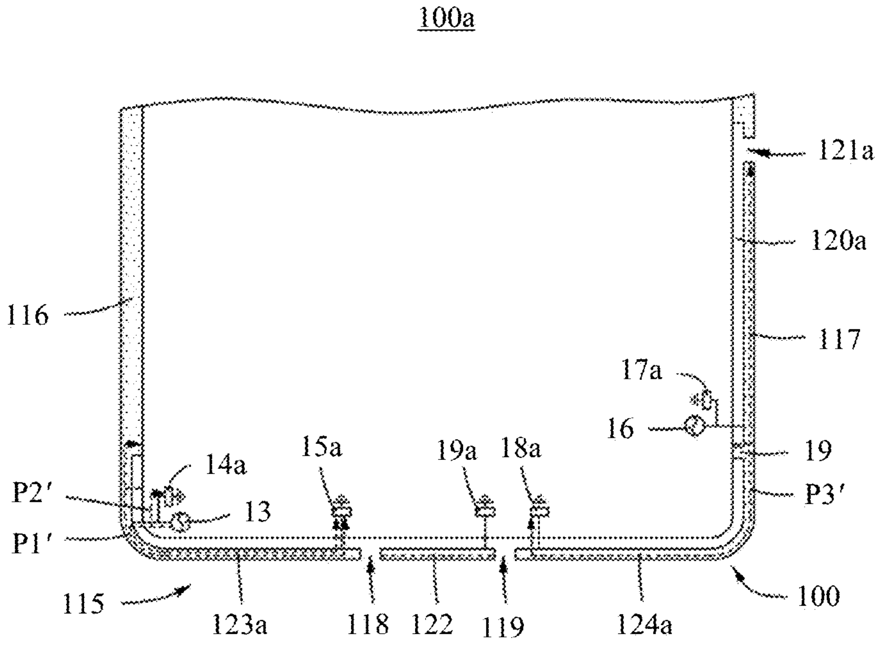
FIG. 13 is a schematic diagram of a terminal antenna according to another embodiment of this application.
Figure 14:
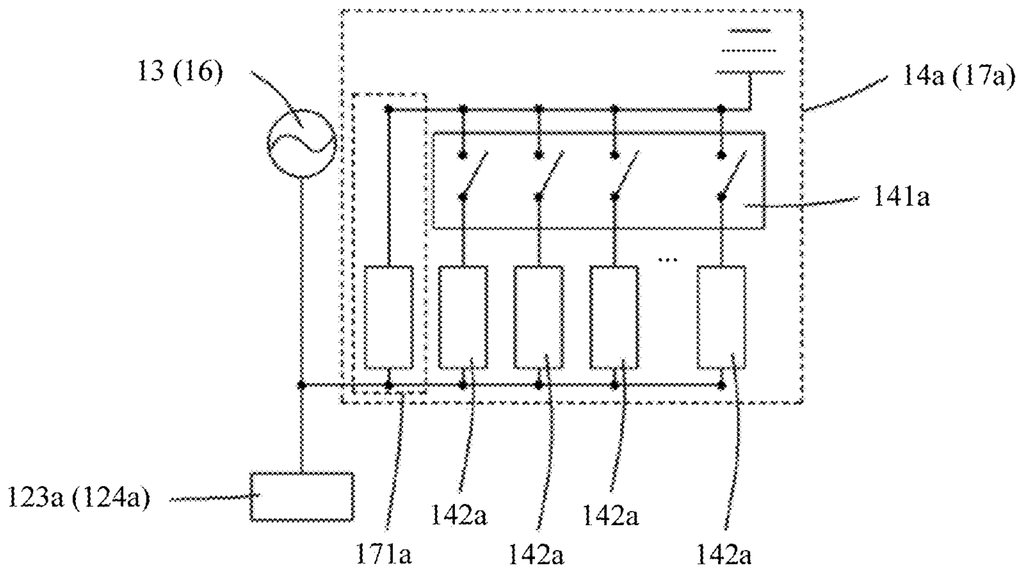
FIG. 14 is a circuit block diagram of a control circuit in the terminal antenna shown in FIG. 13.
Figure 15:
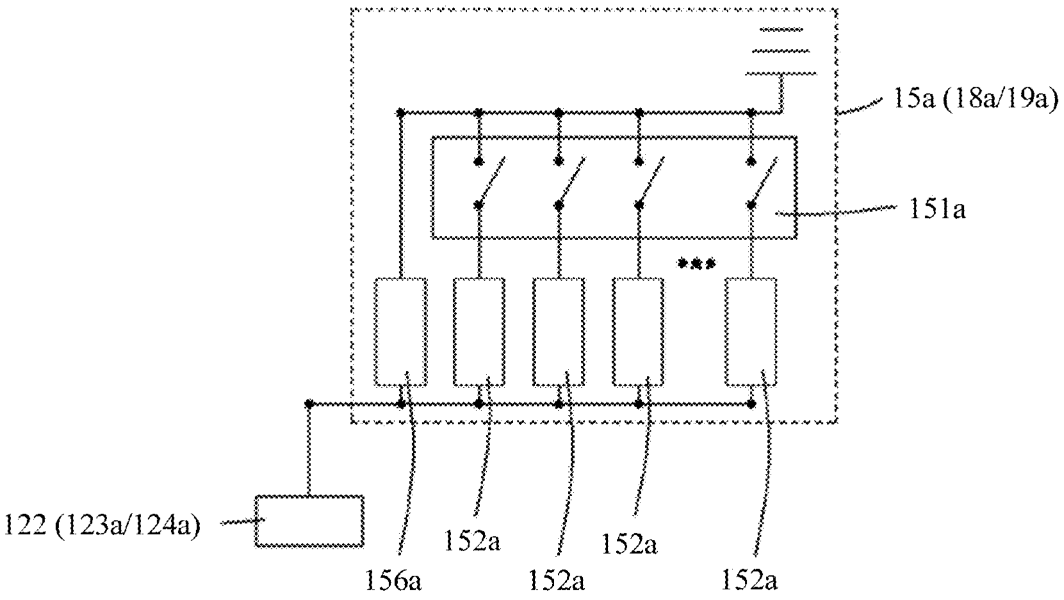
FIG. 15 is a circuit block diagram of a first switching circuit in the terminal antenna shown in FIG. 13.

Referring to FIG. 13-FIG. 15, this application further provides a terminal antenna 100*a*. A structure of the terminal antenna 100*a* is approximately the same as a structure of the terminal antenna 100, and each includes a housing 11, a first feed 13, a second feed 16, and a grounding portion 19. A difference between the terminal antenna 100*a* and the terminal antenna 100 lies in that a structure of a frame 112 in the terminal antenna 100*a* is approximately mirror-symmetric with a structure of the frame 112 in the terminal antenna 100. For example, in Embodiment 1, the first gap 118 and the first side portion 116 are located on a right side of the housing 11, and the second gap 119 and the second side portion 117 are located on a left side of the housing 11. However, in Embodiment 2, the first gap 118 and the first side portion 116 are located on the left side of the housing 11, and the second gap 119 and the second side portion 117 are located on the right side of the housing 11. In addition, an opening groove 120*a* of the terminal antenna 100*a* extends to an approximate middle location of the second side portion 117, and the opening groove 120*a* extends to an end of the first side portion 116 close to an end portion 115. A third gap 121*a* of the terminal antenna 100*a* is provided at the approximate middle location of the second side portion 117 of the frame 112. In this case, on the terminal antenna 100*a*, the frame 112 between the first gap 118 and the second gap 119 forms an isolating portion 122. The frame 112 on a side of the first gap 118 away from the second gap 119 forms a first radiator 123*a*. The frame 112 between the second gap 119 and the third gap 121*a* forms a second radiator 124*a*. One end of the grounding portion 19 is grounded, and the other end is electrically connected to an end that is of the second side portion 117 of the second radiator 124*a* and that is close to the end portion 115. In addition, the terminal antenna 100*a* further includes a control circuit 14*a*, a first switching circuit 15*a*, a second switching circuit 17*a*, a third switching circuit 18*a*, and a tuning circuit 19*a*. By adjusting each switching circuit, each control circuit, and each tuning circuit, full coverage by the terminal antenna 100*a* in a low band is implemented.

In some embodiments, the first feed 13 is electrically connected to a junction of the first side portion 116 and the end portion 115 that are on the first radiator 123*a*, and is configured to feed a current signal to the first radiator 123*a*. One end of the control circuit 14*a* is grounded, and the other end is connected between the first feed 13 and the first radiator 123*a*, to control the first radiator 123*a* to radiate a radiation signal in the low band or a signal in a medium-high band. One end of the first switching circuit 15*a* is grounded, and the other end is connected to an end of the first radiator 123*a* close to the second gap 119, to provide impedance matching between the first feed 13 and the first radiator 123*a*, thereby improving radiation efficiency.

In some embodiments, the second feed 16 is electrically connected to a side that is of the grounding portion 19 on the second radiator 124*a* and that is away from the end portion 115. One end of the second switching circuit 17*a* is grounded, and the other end is electrically connected between the second feed 16 and the second radiator 124*a*, to switch a radiation band. One end of the third switching circuit 18*a* is grounded, and the other end is electrically connected to the second radiator 124*a*, to provide impedance matching between the second feed 16 and the second radiator 124*a*, thereby improving radiation efficiency. One end of the tuning circuit 19*a* is grounded, and the other end is electrically connected to the isolating portion 122, to adjust a resonance frequency of the isolating portion 122. When the control circuit 14*a* is turned off, after a current is fed from the first feed 13, the current flows through the first radiator 123*a*, and is grounded by using the first switching circuit 15*a* and a middle frame 111 (refer to a path P1'), to radiate a signal in the low band. When the control circuit 14*a* is turned on, after a current is fed from the first feed 13, the current flows through the first radiator 123*a*, and is grounded by using the first switching circuit 15*a* (refer to a path P2'), to radiate a signal in the medium-high band. In this way, the first radiator 123*a* can radiate a signal in the low band or the medium-high band by turning off or turning on the control circuit 14*a*. It may be understood that, after the current is fed from the first feed 13, the current further flows to a side that is of the first radiator 123*a* and on which the second gap 119 is located, and is coupled to the isolating portion 122 by using the second gap 119.

It may be understood that, after a current is fed from the second feed 16, the current flows through the second radiator 124*a*, and is grounded by using the grounding portion 19 and the third switching circuit 18*a* (refer to a path P3'). In this case, the second radiator 124*a* radiates a signal in the low band. It may be understood that, after the current is fed from the second feed 16, the current further flows to a side that is of the second radiator 124*a* and on which the third gap 121*a* is located, to radiate a signal of the second radiator 124*a* in a parasitic resonance band, thereby improving radiation performance of the second radiator 124. It may be understood that, after the current is fed from the second feed 16, the current further flows to a side that is of the second radiator 124*a* and on which the first gap 118 is located, and is coupled to the isolating portion 122 by using the first gap 118.

Still referring to FIG. 14, in some embodiments, the control circuit 14*a* includes a switch unit 141*a* and at least one control element 142*a*. The switch unit 141*a* includes several switches, and one end of each switch is grounded. The other end of each switch is connected to one end of each control element 142*a* in a one-to-one correspondence manner. All control elements 142*a* are connected in parallel, and the other end of each control element 142*a* is electrically connected between the first feed 13 and the first radiator 123*a*. In some embodiments, a circuit structure of the second switching circuit 17*a* is approximately the same as a circuit structure of the control circuit 14*a*.

In some embodiments, the second switching circuit 17*a* further includes a first bypass element 171*a*. One end of the first bypass element 171*a* is grounded, and the other end is electrically connected between the second feed 16 and the second radiator 124*a*, to maintain a connected state between the second switching circuit 17*a* and each of the second radiator 124*a* and the second feed 16.

In some embodiments, the first switching circuit 15*a* includes a switch unit 151*a* and at least one switching element 152*a*. The switch unit 151*a* includes several switches, and one end of each switch is grounded. The other end of each switch is connected to one end of each switching element 152*a* in a one-to-one correspondence manner. All switching elements 152*a* are connected in parallel, and the other end of each switching element 152*a* is electrically connected to the first radiator 123*a*.

In some embodiments, the first switching circuit 15*a* further includes a second bypass element 156*a*. One end of the second bypass element 156*a* is grounded, and the other end is electrically connected to the first radiator 123, to maintain a connected state between the first switching circuit 15*a* and the first radiator 123*a* when all switches in the second switch unit 151*a* are turned off.

In some embodiments, circuit structures of the third switching circuit 18_a_ and the tuning circuit 19_a_ are approximately the same as a circuit structure of the first switching circuit 15_a_.

It may be understood that the switch in each switch unit is controlled to turn off or turn on, so that the first radiator 123_a_ or the second radiator 124_a_ is switched to a different switching element or control element. Because each switching element or each control element has a corresponding impedance, by turning off or turning on each switch, a frequency of the first radiator 123_a_ or the second radiator 124_a_ can be effectively adjusted, and/or a resonance frequency of the isolating portion 122 can be adjusted.

It may be understood that each control element, each switching element, and each bypass element may be at least one passive element or a combination of several passive elements. The passive element may be an inductor, a capacitor, a resistor, or the like.

Referring to FIG. 14 and FIG. 15, when a switch that is in the control circuit 14_a_ and that corresponds to the at least one control element 142_a_ is turned on, the first radiator 123_a_ radiates a radiation signal in the medium-high band. When switches that are in the control circuit 14_a_ and that correspond to all the control elements 142_a_ are turned off, the first radiator 123_a_ radiates a radiation signal in the low band.

In some embodiments, the control element 142_a_ in the control circuit 14_a_ may be an inductor, and a range of equivalent inductance values of several control elements 142_a_ is 1-10 nH.

When a switch that is in the first switching circuit 15_a_ and that corresponds to the at least one switching element 152_a_ is turned on, a resonance frequency of the first radiator 123_a_ may be adjusted.

Further, when the first radiator 123_a_ radiates a signal in the medium-high band, several switching elements of the third switching circuit 18_a_ may be gated through controlling, so that the second radiator 124_a_ generates medium-high-frequency resonance, assisting in improving radiation performance of the first radiator 123_a_ in the medium-high band.

In some embodiments, the switching element 152_a_ in the first switching circuit 15_a_ may be a capacitor, and a range of a capacitance value of an equivalent capacitor of the switching element 152_a_ is 0-6.8 pF.

In some embodiments, the switching element in the third switching circuit 18_a_ may be equivalent to a grounded capacitor, and a range of an equivalent capacitance value is 0.5-4.7 pF.

That is, the control circuit 14_a_ is configured to control the first radiator 123_a_ to radiate a signal in the low band or a signal in the medium-high band. When the first radiator 123_a_ radiates a signal in the low band, the first switching circuit 15_a_ may be configured to switch a specific band range when the first radiator 123_a_ operates in the low band.

It may be understood that when capacitance values of the equivalent capacitor of the switching element 152_a_ are different, the first radiator 123_a_ may also radiate different signals in a low-frequency radiation band. For example, in some embodiments, the switching element 152_a_ of the first switching circuit 15_a_ is a capacitor, and a range of a capacitance value of the equivalent capacitor of the switching element 152_a_ is 0-3 pF. In an embodiment, when a capacitance value of an equivalent capacitor of a gated switching element 152_a_ is 0-0.5 pF, the first radiator 123 may cover 900 MHz. In an embodiment, when a capacitance value of an equivalent capacitor of a gated switching element 152_a_ is a capacitance of 2-3 pF, the first radiator 123 may cover 700 MHz. In this way, band switching of the first radiator 123_a_ in a full low band is implemented. In addition, the first radiator 123_a_ and the second radiator 124_a_ can together implement a dual-uplink dual-downlink low frequency antenna system.

When different switching elements in the second switching circuit 17_a_ and the third switching circuit 18_a_ are gated through controlling, the second radiator 124_a_ is enabled to radiate different signals in the low-frequency radiation band. Further, the isolating portion 122 is grounded by using a bypass element in the tuning circuit 19_a_, and radiates a signal of the second radiator 124_a_ in a low-frequency resonance band, to expand bandwidth of the second radiator 124_a_.

In some embodiments, when a range of an inductance value of an equivalent inductor of the second switching circuit 17_a_ is 0-4.7 nH or a range of a capacitance value of an equivalent capacitor of the second switching circuit 17_a_ is 6-12 pF, and a range of an inductance value of an equivalent inductor of the third switching circuit 18_a_ is 0-22 nH or a range of a capacitance value of an equivalent capacitor of the third switching circuit 18_a_ is 0.5-2.2 pF, the second radiator 124_a_ may switch to different low bands based on different equivalent inductance values or equivalent capacitance values.

In some embodiments, the bypass element of the tuning circuit 19_a_ is an inductor, and a range of an inductance value of an equivalent inductor of the bypass element is 15-20 nH.

When both the first radiator 123_a_ and the second radiator 124_a_ operate in the low band, isolation between the first radiator 123_a_ and the second radiator 124_a_ may be adjusted by adjusting a tuning element of the tuning circuit 19_a_.

It may be understood that, in some embodiments, a circuit structure of the tuning circuit 19_a_ is approximately the same as a structure of the first switching circuit 15_a_, and a difference lies in that the switching element in the first switching circuit 15_a_ is replaced with the tuning element in the tuning circuit 19_a_.

In some embodiments, tuning elements in the tuning circuit 19_a_ may be together equivalent to an inductor, and a range of an inductance value of the equivalent inductor of the tuning elements in the tuning circuit 19_a_ is 1-68 nH.

In some embodiments, the tuning elements of the tuning circuit 19_a_ include a first tuning element and a second tuning element. A range of an inductance value of an equivalent inductor of the first tuning element is 1 nanohenry to 5 nanohenries, and a range of an inductance value of an equivalent inductor of the second tuning element is 60 nanohenries to 68 nanohenries. When a switch corresponding to the first tuning element is turned on and a switch corresponding to the second tuning element is turned off, the tuning circuit 19_a_ is configured to adjust isolation when both the first radiator 123_a_ and the second radiator 124_a_ operate in 900 MHz. When the switch corresponding to the first tuning element is turned off, and the switch corresponding to the second tuning element is turned on, the tuning circuit 19_a_ is configured to adjust isolation when both the first radiator 123_a_ and the second radiator 124_a_ operate in 700 MHz.

In this way, the first radiator 123_a_ may radiate, by using the control circuit 14_a_, a radiation signal in the low band or the high band, thereby implementing multiplexing of the first radiator 123_a_ in the low band and the medium-high band. Further, the terminal antenna 100_a_ further gates, through controlling, the switching elements in the first switching circuit 15_a_, the second switching circuit 17_a_, and the third switching circuit 18_a_, to adjust frequency ranges when the first radiator 123*a* and the second radiator 124*a* operate in the low band, to implement band switching of the terminal antenna 100*a* in the full low band (that is, 700 MHz to 960 MHz).

It may be understood that the terminal antenna 100*a* further adjusts, by using the tuning circuit 19*a*, isolation when both the first radiator 123*a* and the second radiator 124*a* operate in the low band, so that the terminal antenna 100*a* has good antenna performance.

In some embodiments, selection is further performed to switch to at least one switching element in the second switching circuit 17*a*, so that the second radiator 124*a* switches to a different low band. Further, the second radiator 124*a* is further configured to radiate a signal in the low-frequency resonance band by conducting the bypass element on the tuning circuit 19*a*, to improve radiation efficiency of the second radiator 124*a*.

The foregoing embodiments are only intended for describing the technical solutions of this application but not for limiting this application. Although this application is described in detail with reference to the preferred embodiments, a person of ordinary skill in the art should understand that modifications or equivalent replacements can be made to the technical solutions of this application without departing from the spirit and essence of the technical solutions of this application.

What is claimed is:

1. A terminal antenna, comprising a frame, a first feed, and a second feed, wherein a first gap and a second gap that partition the frame are provided on the frame to form a first conductor, a second conductor, and a third conductor on the frame, at least a part of the frame on a side of the first gap away from the second gap forms the first conductor, at least a part of the frame on a side of the second gap away from the first gap forms the second conductor, the frame between the first gap and the second gap forms the third conductor, the first feed is electrically connected to the first conductor to feed current, so that the first conductor radiates a signal, the second feed is electrically connected to the second conductor, so that the second conductor radiates a signal in a low band, the terminal antenna further comprises a control circuit, one end of the control circuit is grounded, and the other end of the control circuit is electrically connected to the first conductor, to control the first conductor to radiate a signal in a medium-high band or radiate a signal in the low band;

a tuning circuit having a first end grounded and a second end electrically connected to the third conductor, the tuning circuit to adjust a resonance band of the third conductor when the first conductor and the second conductor simultaneously operate in the low band with the first feed electrically connected to the first conductor and the second feed electrically connected to the second conductor;

when the control circuit controls the first conductor radiating the signal in the low band, after the current is fed into the first conductor from the first feed, the current is grounded through an end that is of the first conductor and that is connected to a grounding middle frame; when the control circuit controls the first conductor radiating the signal in the medium-high band, after the current is fed into the first conductor from the first feed, the current flows through the first conductor and is grounded through the control circuit.

2. The terminal antenna according to claim 1, wherein the control circuit comprises a first passive element, a second passive element, a first switch, and a second switch, one end of the first switch and one end of the second switch are separately grounded, the other end of the first switch is connected to one end of the first passive element, the other end of the second switch is connected to one end of the second passive element, the other end of the first passive element and the other end of the second passive element each are electrically connected to the first conductor, when the first switch corresponding to the first passive element is turned on, the first conductor radiates a signal in the medium-high band, and when the second switch corresponding to the second passive element is turned on, the second conductor radiates a signal in the low band.

3. The terminal antenna according to claim 2, wherein the first passive element is a capacitor, and a range of a capacitance value of the first passive element is 0 picofarads to 2 picofarads; and the second passive element is an inductor, and a range of an inductance value of the second passive element is 0 nanohenries to 5 nanohenries.

4. The terminal antenna according to claim 2, wherein the tuning circuit comprises a third passive element and a third switch, one end of the third switch is grounded via the first end of the tuning circuit, the other end of the third switch is electrically connected to one end of the third passive element, the other end of the third passive element is connected to the third conductor via the second end of the tuning circuit, and by controlling the third switch to turn on or turn off, isolation between the first conductor and the second conductor is adjusted when the first conductor and the second conductor operate in the low band.

5. The terminal antenna according to claim 4, wherein the third passive element is an inductor, and a range of an inductance value of the third passive element is 1 nanohenry to 68 nanohenries.

6. The terminal antenna according to claim 4, wherein the tuning circuit further comprises a fourth passive element, wherein one end of the fourth passive element is grounded via the first end of the tuning circuit, and the other end is electrically connected to the third conductor via the second end of the tuning circuit.

7. The terminal antenna according to claim 4, wherein when the first switch in the control circuit is turned on, the third switch in the tuning circuit is turned off.

8. The terminal antenna according to claim 4, wherein when the second switch in the control circuit is turned on, the third switch in the tuning circuit is turned on.

9. The terminal antenna according to claim 4, wherein the terminal antenna further comprises a first switching circuit and a second switching circuit, the first switching circuit and the second switching circuit each comprise several passive elements and several corresponding switches, one end of each of the several switches in the first switching circuit is grounded, the other end is connected to one end of each of the several passive elements in the first switching circuit in a one-to-one correspondence manner, and the other end of each of the several passive elements in the first switching circuit is connected between the first feed and the first conductor; and one end of each of the several switches in the second switching circuit is grounded, the other end of each of the several switches in the second switching circuit is connected to one end of each of the several passive elements in the second switching circuit in a one-to-one correspondence manner, and the other end of each of the several passive elements in the second switching circuit is connected between the second feed and the second conductor.

10. The terminal antenna according to claim 1, wherein the first feed is electrically connected to an end of the first conductor close to the first gap.

11. The terminal antenna according to claim 1, wherein the frame comprises an end portion, a first side portion, and a second side portion, the first side portion and the second side portion are disposed opposite to each other and are respectively disposed at two ends of the end portion, the first gap and the second gap are spaced on the end portion, the first gap is provided close to the first side portion, the second gap is provided close to the second side portion, and the first feed is electrically connected to a junction of the second side portion and the end portion that is on the first conductor.

12. The terminal antenna according to claim 11, wherein the control circuit comprises several passive elements and several corresponding switches, one end of each of the several switches in the control circuit is grounded, the other end is connected to one end of each of the several passive elements in the control circuit in a one-to-one correspondence manner, the other end of each of the several passive elements in the control circuit is connected between the first conductor and the first feed, and when at least one switch in the control circuit is turned on, the first conductor radiates a signal in the medium-high band; and when all switches in the control circuit are turned off, the first conductor radiates a signal in the low band.

13. The terminal antenna according to claim 12, wherein the passive element is an inductor, and a range of equivalent inductance values of the several passive elements is 1 nanohenry to 10 nanohenries.

14. The terminal antenna according to claim 11, wherein the tuning circuit comprises several tuning elements and several switches, one end of each of the several switches in the tuning circuit is grounded via the first end of the tuning circuit, the other end is connected to one end of each of several passive elements in the tuning circuit in a one-to-one correspondence manner, and the other end of each of the several passive elements in the tuning circuit is connected to the third conductor via the second end of the tuning circuit; and by controlling the several switches in the tuning circuit to turn on or turn off, isolation between the first conductor and the second conductor is adjusted when the first conductor and the second conductor operate in the low band.

15. The terminal antenna according to claim 14, wherein the several passive elements of the tuning circuit comprise a first passive element and a second passive element, both the first passive element and the second passive element are inductors, a range of an inductance value of the first passive element is 1 nanohenry to 5 nanohenries, and a range of an inductance value of the second passive element is 60 nanohenries to 68 nanohenries; in the tuning circuit, when a switch corresponding to the first passive element is turned on and a switch corresponding to the second passive element is turned off, the tuning circuit is configured to adjust isolation when both the first conductor and the second conductor operate in 900 MHz; and in the tuning circuit, when the switch corresponding to the first passive element is turned off and the switch corresponding to the second passive element is turned on, the tuning circuit is configured to adjust isolation when both the first conductor and the second conductor operate in 700 MHZ.

16. The terminal antenna according to claim 11, wherein the terminal antenna further comprises at least one group of circuits of a first switching circuit, a second switching circuit, and a third switching circuit, the first switching circuit, the second switching circuit, and the third switching circuit each comprise several passive elements and several switches, one end of each of the several switches of the first switching circuit is grounded, the other end is connected to one end of each of the several passive elements in the first switching circuit in a one-to-one correspondence manner, and the other end of each of the several passive elements in the first switching circuit is connected to the first conductor; one end of each of the several switches of the second switching circuit is grounded, the other end is connected to one end of each of the several passive elements in the second switching circuit in a one-to-one correspondence manner, and the other end of each of the several passive elements in the second switching circuit is connected between the second feed and the second conductor; and one end of each of the several switches of the third switching circuit is grounded, the other end is connected to one end of each of the several passive elements in the third switching circuit in a one-to-one correspondence manner, and the other end of each of the several passive elements in the third switching circuit is connected to the second conductor.

17. A mobile terminal device, comprising:

a terminal antenna, wherein the terminal antenna comprises:

a frame, a first feed, and a second feed, wherein a first gap and a second gap that partition the frame are provided on the frame to form a first conductor, a second conductor, and a third conductor on the frame, at least a part of the frame on a side of the first gap away from the second gap forms the first conductor, at least a part of the frame on a side of the second gap away from the first gap forms the second conductor, the frame between the first gap and the second gap forms the third conductor, the first feed is electrically connected to the first conductor to feed current, so that the first conductor radiates a signal, the second feed is electrically connected to the second conductor, so that the second conductor radiates a signal in a low band, the terminal antenna further comprises a control circuit, one end of the control circuit is grounded, and the other end of the control circuit is electrically connected to the first conductor, to control the first conductor to radiate a signal in a medium-high band or radiate a signal in the low band;

a tuning circuit having a first end grounded and a second end electrically connected to the third conductor, the tuning circuit to adjust a resonance band of the third conductor when the first conductor and the second conductor simultaneously operate in the low band with the first feed electrically connected to the first conductor and the second feed electrically connected to the second conductor;

when the control circuit controls the first conductor radiating the signal in the low band, after the current is fed into the first conductor from the first feed, the current is grounded through an end that is of the first conductor and that is connected to a grounding middle frame; When the control circuit controls the first conductor radiating the signal in the medium-high band, after the current is fed into the first conductor from the first feed, the current flows through the first conductor and is grounded through the control circuit.

18. The mobile terminal device according to claim 17, wherein the control circuit comprises a first passive element, a second passive element, a first switch, and a second switch, one end of the first switch and one end of the second switch are separately grounded, the other end of the first switch is connected to one end of the first passive element, the other end of the second switch is connected to one end of the second passive element, the other end of the first passive element and the other end of the second passive element each are electrically connected to the first conductor, when the first switch corresponding to the first passive element is turned on, the first conductor radiates a signal in the medium-high band, and when the second switch corresponding to the second passive element is turned on, the second conductor radiates a signal in the low band.

19. The mobile terminal device according to claim 18, wherein the first passive element is a capacitor, and a range of a capacitance value of the first passive element is 0 picofarads to 2 picofarads; and the second passive element is an inductor, and a range of an inductance value of the second passive element is 0 nanohenries to 5 nanohenries.

20. The mobile terminal device according to claim 18, wherein the tuning circuit comprises a third passive element and a third switch, one end of the third switch is grounded via the first end of the tuning circuit, the other end of the third switch is electrically connected to one end of the third passive element, the other end of the third passive element is connected to the third conductor via the second end of the tuning circuit, and by controlling the third switch to turn on or turn off, isolation between the first conductor and the second conductor is adjusted when the first conductor and the second conductor operate in the low band.

* * * * *